United States Patent
Milenkovic et al.

(10) Patent No.: US 7,180,422 B2
(45) Date of Patent: Feb. 20, 2007

(54) ASSET MANAGEMENT METHODS AND APPARATUS

(75) Inventors: Milan Milenkovic, Portland, OR (US); Vijay Tewari, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 10/750,454

(22) Filed: Dec. 29, 2003

(65) Prior Publication Data

US 2005/0145688 A1  Jul. 7, 2005

(51) Int. Cl.
*G08B 13/14* (2006.01)
(52) U.S. Cl. .............. 340/572.4; 340/572.1; 340/825.49; 340/539.13; 235/375
(58) Field of Classification Search ......... 340/572.1, 340/825.49, 539.13, 572.4, 10.1, 10.51; 713/2; 235/375
See application file for complete search history.

(56) References Cited

U.S. PATENT DOCUMENTS

| 5,018,061 A | * | 5/1991 | Kishigami et al. ............ 711/3 |
| 6,034,621 A | * | 3/2000 | Kaufman ................... 340/7.21 |
| 6,177,860 B1 | * | 1/2001 | Cromer et al. ............. 340/10.1 |
| 6,738,628 B1 | * | 5/2004 | McCall et al. ........... 455/456.1 |
| 6,859,757 B2 | * | 2/2005 | Muehl et al. ............... 702/184 |
| 6,876,295 B1 | * | 4/2005 | Lewis ..................... 340/10.34 |

* cited by examiner

*Primary Examiner*—Anh V. La
(74) *Attorney, Agent, or Firm*—Schwegman, Lundberg, Woessner & Kluth, P.A.

(57) ABSTRACT

Methods and apparatus for correlating physical and logical attributes of devices include associating logical-tags (L-tags) and physical-tags (P-tags) with target devices. A P-tag includes a P-tag identifier, which can be read by a P-tag reading device, regardless of whether power is applied to the target device. The P-tag identifier and other information can be sent to an asset manager, which can determine a location of the device. An L-tag includes an L-tag identifier and may include other L-tag information describing logical attributes of the device. The L-tag information also can be sent to an asset manager. The asset manager maintains a tracking record for the device, which may include the P-tag identifier, the L-tag identifier, information regarding the asset's logical attributes, and information regarding the asset's physical attributes. By maintaining similar tracking records for a plurality of devices, the asset manager can track and manage the plurality of devices.

54 Claims, 15 Drawing Sheets

ASSET MANAGEMENT METHODS AND APPARATUS

TECHNICAL FIELD

The inventive subject matter pertains to methods and apparatus to manage attributes of various assets and, more particularly, to methods and apparatus to correlate and track physical and logical attributes of electronic devices.

BACKGROUND

Entities that manage large numbers of computers often use asset-tracking techniques to keep track of the computers' physical and/or logical attributes. For example, a physical attribute that is often maintained is a computer's physical location. Logical attributes that are often maintained are a computer's name and IP (Internet protocol) address, for example.

Physical location information is desirable to discourage theft, to optimize use of resources, to maintain knowledge of the quantities and qualities of computing assets, and to provide the ability to locate particular computers when they are needed. One method of physical attribute tracking is to automatically generate and maintain a location map, which depicts the locations of various computers within a facility. Another method is to generate and maintain a physical attribute database, which includes information about the locations in an electronic form.

Logical attribute information is desirable to track computer usage, connectivity, health and status, installed software information, and hardware capabilities, for example. In some cases, logical attribute information is maintained in a logical attribute database, which includes information about a computer's name (e.g., identity), IP address, software version information, and other logical attributes, for example.

Prior methods for maintaining asset information are deficient in several ways. First, they may require a human operator to keep the manual maps or attribute databases synchronized and up-to-date. In a dynamic environment with extensive migration, maintaining this information is a time-consuming process, and the information quickly becomes out-of-date. Another problem that exists with prior asset-tracking techniques is that physical attribute information and logical attribute information are often separately maintained. Accordingly, it is burdensome to retrieve both of these types of information for a particular asset.

In some situations, out-of-date information can have serious consequences. For example, a datacenter includes a host computer, which is responsible for providing services to remote users. Such a datacenter may include one or more backup computers, which can be used to replace the current host computer in the event of a failure. When a host failure occurs, it is desirable to rapidly locate a backup host and bring the backup host online. If the physical or logical attribute information for potential backup hosts is out of date, an unacceptably long time may elapse before an acceptable backup host can be located and brought online.

Accordingly, what are needed are methods and apparatus for maintaining asset attribute information in such a manner that the information is less prone to becoming out-of-date. Further needed are methods and apparatus that do not rely solely on human operators to maintain attribute information. Also needed are methods and apparatus that enable physical attribute and logical attribute information to be updated and correlated when physical or logical attribute changes occur.

BRIEF DESCRIPTION OF THE DRAWINGS

The appended claims point out, with particularity, different embodiments of the inventive subject matter described herein. However, the detailed description presents a more complete understanding of various embodiments of the inventive subject matter when considered in connection with the figures, wherein like-reference numbers refer to similar items throughout the figures and:

DETAILED DESCRIPTION

Various embodiments of the inventive subject matter described herein provide methods and apparatus to maintain and provide access to physical and/or logical attribute information for tracked assets, such as electronic devices. Embodiments of the inventive subject matter may be referred to, individually and/or collectively, herein by the term "invention" merely for convenience and without intending to voluntarily limit the scope of this application to any single invention or inventive concept if more than one is in fact disclosed.

Prior art methods for asset tracking are prone to becoming inaccurate very quickly. This is particularly true in tracking physical attributes and logical attributes. A "physical attribute" is defined herein to mean an attribute of an asset that is describable in relation to the asset's physical position or appearance features within the physical world, such as an asset's physical location, orientation, appearance, and the like. A physical attribute can be deduced and/or read by external machinery without requiring the target device to be powered or connected to a computer network. A "logical attribute" is defined herein to mean an attribute of the asset that is describable by the asset's identity or capabilities within a system, such, such as an asset's identification, device type, owner, user, network address, configuration, and the like.

By associating a physical-tag (P-tag) and a logical-tag (L-tag) with selected assets, various embodiments of the invention enable physical and/or logical attributes of a plurality of assets automatically to be maintained and correlated. This serves several purposes, including theft detection and deterrence, asset location determination, asset configuration information, and owner identification, among other things.

Figure 1:
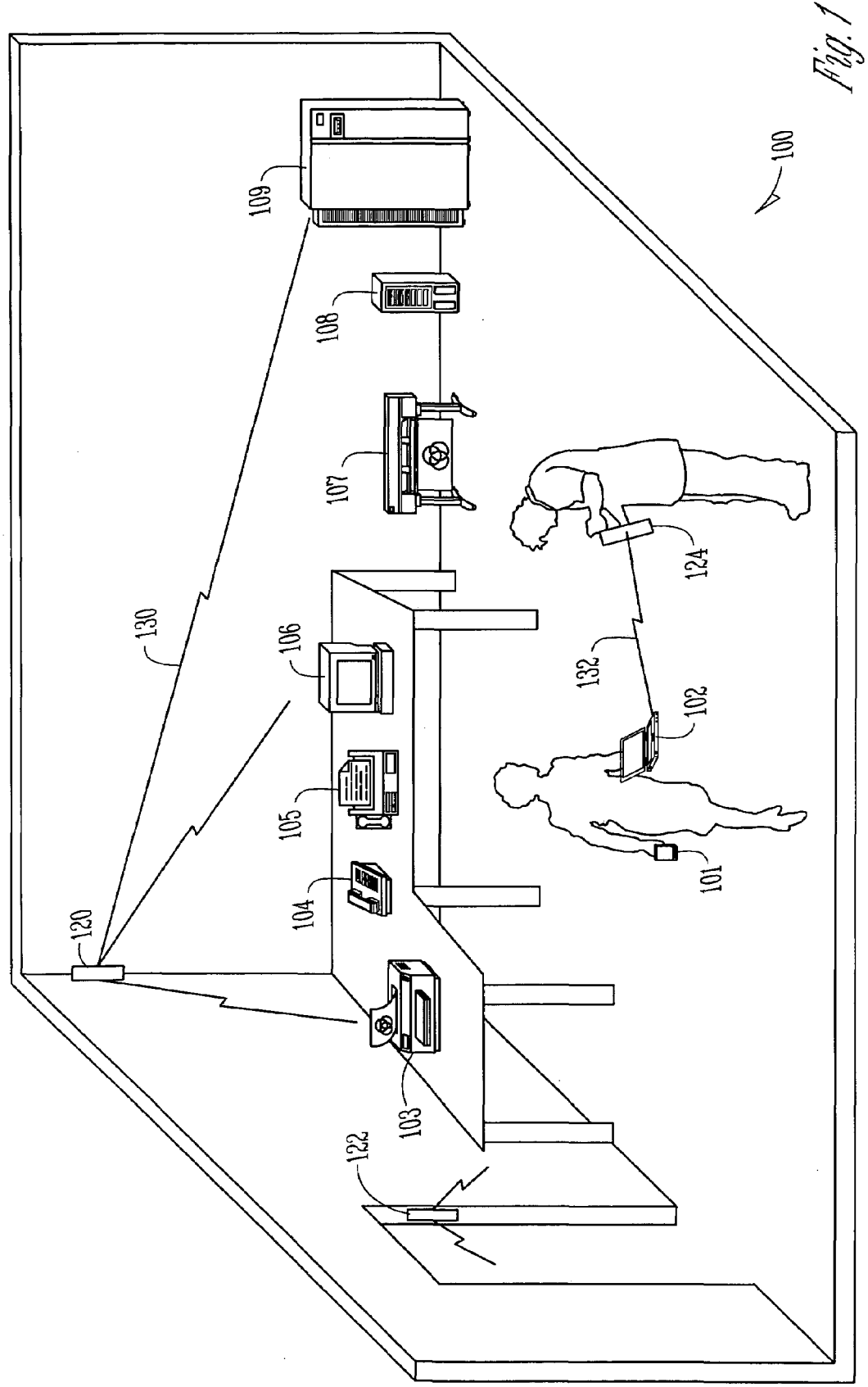
FIG. 1 is a perspective view of a type of environment in which embodiments of the invention can be implemented.

FIG. 1 is a perspective view of a type of environment in which embodiments of the invention can be implemented. Specifically, FIG. 1 illustrates a room 100, which includes a plurality of electronic devices 101, 102, 103, 104, 105, 106, 107, 108, and 109.

The term "electronic device" is defined, herein, as any type of device that has processing capabilities, and which is capable of receiving and sending messages over a wired or wireless communication link. As FIG. 1 illustrates, electronic devices include, for example but not by way of limitation, personal data assistants (PDAs) 101, laptop computers 102, printers 103, telephones 104, fax machines 105, desktop computers 106, plotters 107, server computers 108, and mainframe computers 109. Electronic devices also include cellular and portable telephones, pagers, radios, monitors, televisions, global positioning system (GPS) receivers, audio and video recording and/or playing equipment, computer peripheral devices, electronic test equipment, vehicles (e.g., airplanes, trucks, automobiles, watercraft), subsystems (e.g., motherboards, video cards, disk drives, etc.), and virtually any other electronic device that is electronically addressable and includes processing capabilities.

Selected ones of the electronic devices 101–109 include a P-tag and an L-tag, which will be described in detail herein. In one embodiment, an L-tag includes information that is stored in a storage medium, and is readable using a software agent executed by the electronic device. The L-tag information includes at least one L-tag identifier (ID) and various logical information, in one embodiment.

The software agent can retrieve various L-tag information from the storage medium, and send the information to a recipient device, as will be described in more detail later. Accordingly, L-tag information can be conveyed over a wired or wireless network connection between the electronic device and the recipient device. In some cases, the recipient device may have requested the L-tag information. In other cases, the electronic device may send the L-tag information to the recipient device without a specific request.

An L-tag ID is an ASCII value, a digital value, or another identifier that is readable by a software agent. In one embodiment, an L-tag ID associated with an electronic device enables that device to be uniquely identified. In another embodiment, an L-tag ID enables the device to be uniquely identified when the ID is correlated with other information (e.g., P-tag indictor, device location, device type or class, and or other logical information). Logical information can include, for example, a device type, hardware and/or software configuration information, owner and/or user information, IP address, and various other types of information, which will be discussed in more detail later.

A P-tag is a device that includes at least one P-tag ID. A P-tag ID includes an alphanumeric value, a symbol, a pattern, or another identifier that is machine readable. In one embodiment, a P-tag ID associated with an electronic device enables that device to be uniquely identified. In another embodiment, a P-tag ID enables the device to be uniquely identified when the ID is correlated with other information (e.g., L-tag ID, device location, device type or class, and or other logical information). Besides a P-tag ID, a P-tag may include other physical attribute and logical attribute information. In one embodiment, a P-tag is both readable and writable (e.g., by an RFID reader/writer), and thus the information stored within the P-tag can be modified.

In one embodiment, a P-tag ID is readable regardless of whether power is applied to the device to which the P-tag is attached. A P-tag includes a P-tag ID that is readable using a radio-frequency (RF) signal, in one embodiment. This type of device is referred to herein as a radio-frequency identification (RFID) P-tag. In another embodiment, a P-tag includes a P-tag ID that is readable using a magnetic reader. This type of device is referred to herein as a magnetic P-tag. In still another embodiment, a P-tag includes a P-tag ID that is readable using an optical scanner. For example, a P-tag ID could include a barcode or other optically scannable image. This type of device is referred to herein as an optical P-tag.

In one embodiment, P-tag IDs are readable over an air interface by P-tag reading devices 120, 122, 124. P-tag reading devices 120, 122, 124 can be stationary, portable or mobile devices. For example, P-tag reading device 120 is a stationary wall-mounted device, P-tag reading device 122 is a stationary doorway-mounted device, and P-tag reading device 124 is a portable hand-held device. In other embodiments (not shown), a P-tag reading device can be mounted on a mobile robot, a mail or cleaning cart, or virtually any other mobile or fixed structure.

During operation, a P-tag reading device 120, 122, 124 attempts to read one or more P-tag IDs in proximity to the reading device. For example, P-tag reading device 120 attempts to read P-tag IDs that can be associated with electronic devices 101–109 located in proximity to the device 120 (e.g., within room 100 or within a certain range). In one embodiment, detected P-tag IDs and/or other information are sent by the P-tag reading device 120 over a wired or wireless connection to a remote processing device (e.g., an asset management device, described later), which can use the information to determine and track a device's location. In another embodiment, detected P-tag IDs are stored by P-tag reading device 120 for later download and/or analysis.

For embodiments that use RFID P-tags, P-tag reading device 120 can send out limited-range RF signals 130 in an attempt to detect RFID P-tags in proximity to the P-tag reading device 120. For embodiments that use optical P-tags, P-tag reading device 120 can optically scan the room in an attempt to detect optical P-tags in visual proximity to the P-tag reading device 120.

In one embodiment, P-tag reading devices can be positioned in proximity to portal points, such as doorways, corridors, windows, gates, toll booths, or other points. For example, P-tag reading device 122 is positioned within a doorway. During operation, P-tag reading device 122 attempts to detect a P-tag that enters or exits the doorway, which indicates that the electronic device associated with the P-tag has passed through the passage point. As with the wall-mounted P-tag reading device 120, the portal-mounted P-tag reading device 122 can send detected P-tag IDs and/or other information over a wired or wireless connection to a remote processing device. The processing device can use this information to determine a device's location, and/or to detect potential theft or unauthorized movement of the device. In another embodiment, detected P-tag IDs are stored by P-tag reading device 122 for later download and/or analysis.

In still another embodiment, P-tag reading devices can be portable devices. For example, P-tag reading device 124 is a hand-held device, which a person can use to selectively read a P-tag in proximity to the device. FIG. 1 illustrates a man with a hand-held P-tag reading device 124, which is reading, over an air interface 132, a P-tag ID on a laptop computer 102 carried by a woman.

In one embodiment, portable P-tag reading device 124 stores the P-tag ID values that it encounters, for later download and/or analysis. In another embodiment, portable P-tag reading device 124 sends detected P-tag IDs and/or other information over a wireless connection to a remote processing device. The remote processing device can use this information to determine a device's location, and/or to detect potential theft or unauthorized movement of the device.

In one embodiment, which will be described later, portable P-tag reading device 124 is capable of accessing and displaying logical information that correlates with a particular P-tag ID. For example, but not by way of limitation, when portable P-tag reading device 124 detects a certain P-tag ID, portable P-tag reading device 124 can retrieve and display information such as the device owner's name. This enables an operator of the P-tag reading device 124 to determine whether the displayed device owner's name is the same as a name on a badge worn by the person carrying the device. Such information can be helpful for theft detection and deterrence, among other things.

P-tag reading device 124 accesses logical information from a storage medium included in the reading device 124, in one embodiment. This information can be loaded into the device, for example, on an occasional basis. In another embodiment, P-tag reading device 124 accesses logical information from the P-tag itself, if such logical information had been previously stored in the P-tag. In still another embodiment, P-tag reading device 124 accesses logical information over a wired or wireless link with a remote processing device. In still another embodiment, P-tag reading device 124 accesses logical information from the L-tag within the electronic device itself. In this embodiment, tag reading device 124 includes an L-tag reading device, in addition to a P-tag reading device. The L-tag reading device can attempt to access L-tag information through a wired or wireless connection established between the tag reading device 124 and the electronic device 102.

The term "tag reading device" is meant to include a device that is capable of reading a P-tag, an L-tag, or both. The wired or wireless connection between the tag reading device 124 can be, for example but not by way of limitation, a Bluetooth connection, a wireless local area network (WLAN) connection, or a wired network connection (e.g., the Internet, a local area network, a wide area network, etc.).

In other embodiments, a fixed tag reading device can include the same capabilities as the portable tag reading device 124 described above. For example, wall-mounted and doorway-mounted devices 120, 122 can include L-tag reading capabilities, in addition to P-tag reading capabilities. In addition, a tag reading device can include wired and/or wireless connections to a network, which can be used to communicate tag IDs and/or other information.

In one embodiment, each tag reading device 120, 122, 124 is capable of detecting tag IDs within a particular range. The range can be very short (e.g., several inches or feet) or very long (e.g., hundreds of feet or miles). In one embodiment, the detection range for a tag reading device is adjustable by adjusting the sensitivity of the tag reading device and/or the transmission power of the electronic devices 101–109.

P-tag and L-tag IDs can be readable over or through other types of media, in addition to an air interface. For example, but not by way of limitation, a P-tag ID is readable through water, solid objects, and other media, in various embodiments.

An L-tag is readable by a software agent that is executed by an electronic device. An L-tag can be located substantially within the interior of the device, although it does not necessarily need to be so located. A P-tag is readable by a P-tag reading device that is external to the electronic device. The P-tag can be located on the exterior of the device, although it does not necessarily need to be so located. Although a P-tag can be located on the exterior of a device, a P-tag can also be located within a device in a manner that it is not visible from the outside. For an optical P-tag, it may be desirable to position the P-tag on the exterior of the device to facilitate scanning by an optical scanner. For an RFID P-tag or a magnetic P-tag, a corresponding P-tag reading device can be capable of reading a P-tag ID and other P-tag information through various surfaces and interior structures associated with the device. Therefore, an RFID P-tag or a magnetic P-tag can be located within the device so that it is not visible from the exterior.

In the description of the various embodiments, each electronic device (e.g., devices 101–109) is said to include one P-tag and one L-tag. In other embodiments, an electronic device could include multiple P-tags and/or L-tags. For example, it may be desirable to include an L-tag for each printed circuit board or other processing component within a particular computer or other device. In such an embodiment, one P-tag ID could correspond to multiple L-tag IDs. Other types of uses of the various embodiments could be imagined by those of skill in the art based on the description herein.

The use of the term "environment" is not meant to imply that embodiments of the invention can only be implemented in limited, defined geographical areas. Although embodiments of the invention can be implemented in limited, defined geographical areas (e.g., a room, building, campus), embodiments of the invention also can be implemented in undefined, limitless geographical areas. For example, in a system that tracks mobile assets, the environment in which embodiments are implemented can be worldwide.

Various embodiments can be implemented in a system in which asset-tracking information is centrally managed by an "asset manager." These embodiments are described in detail, below. In other embodiments, asset-tracking information may be managed by a distributed entity. Where appropriate, distributed asset-tracking management is discussed throughout the following description. However, the descriptions relating to FIGS. 2–19 focus on a centralized management system. Those of skill in the art would understand, based on the description herein, how the embodiments disclosed below can be modified for a distributed asset management system.

Figure 2:
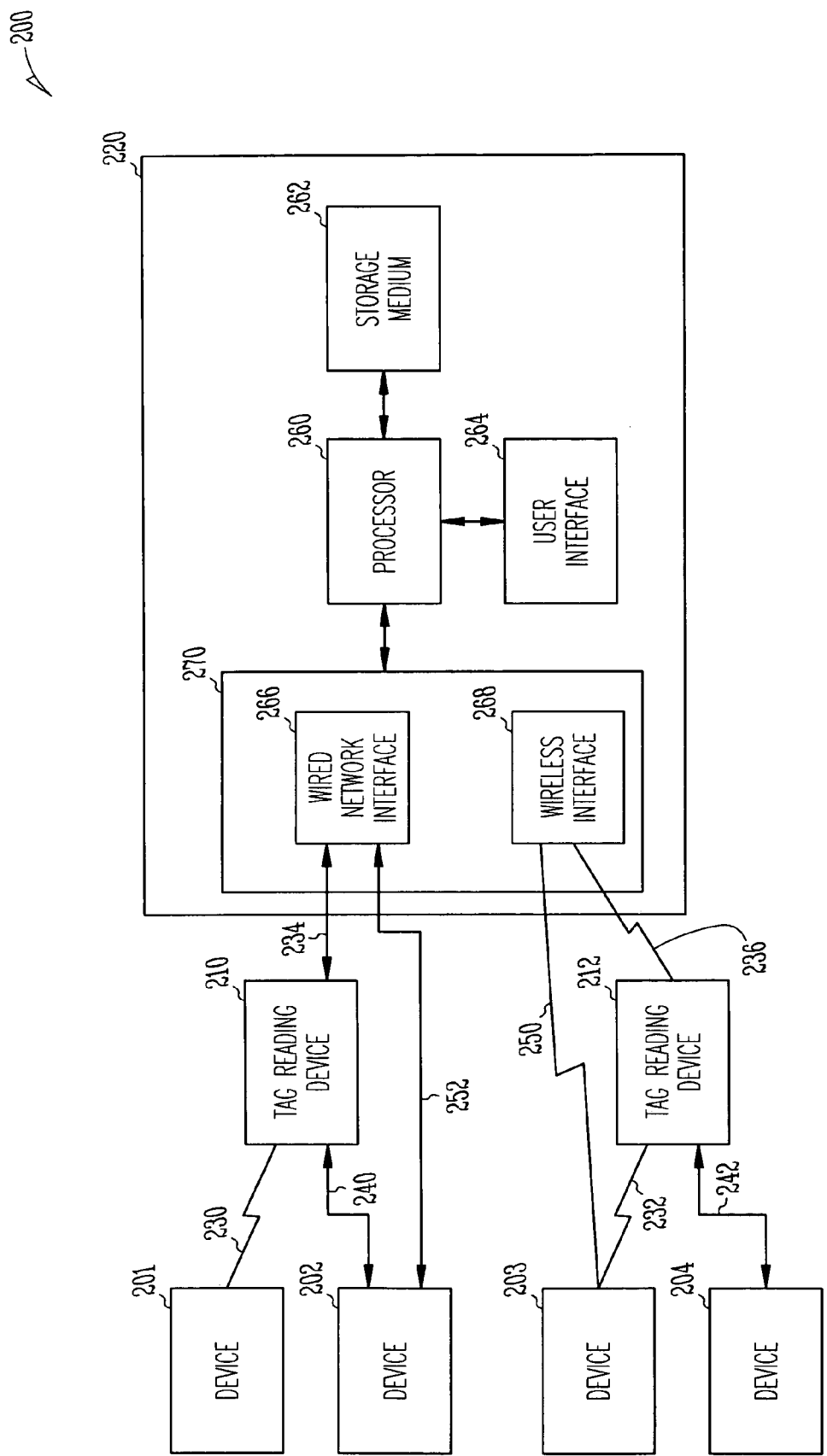
FIG. 2 is a simplified block diagram illustrating an asset-tracking system, in accordance with an embodiment of the invention.

FIG. 2 is a simplified block diagram illustrating an asset-tracking system 200, in accordance with an embodiment of the invention. System 200 includes a plurality of electronic devices 201, 202, 203, 204, at least one tag reading device 210, 212, and at least one asset manager 220.

Selected ones of electronic devices 201–204 include a P-tag and/or an L-tag. In various embodiments, the P-tag and/or L-tag are readable using a tag reading device 210, 212. A tag reading device 210, 212 can include a P-tag reading device, an L-tag reading device, or both, in various embodiments.

In one embodiment, the P-tag is readable by a tag reading device 210, 212 over an air interface 230, 232 using an RF signal or through magnetic or optical detection. In some embodiments, described below, the P-tag also is writable by the tag reading device 210, 212 over the air interface 230, 232. The P-tag ID and other P-tag information can be stored locally within the tag reading device 210, 212, and/or sent to an asset manager 220 via hardwired links 234, wireless links 236, and/or combinations of these types of links. The links between the asset manager 220 and the tag reading devices 210, 212 can be direct, or intervening nodes (not illustrated) can exist between the asset manager 220 and the devices 210, 212.

The L-tag is also readable by a tag reading device 210, 212, in one embodiment. The L-tag is readable over the air interface 230, 232 using a wireless connection (e.g., a WLAN or Bluetooth connection), in one embodiment. In addition or alternatively, the L-tag is readable over a wired connection 240, 242, which can include one or more ports and intermediate devices (e.g., computers). For example, a tag reading device 210, 212 can include a port that enables the tag reading device 210, 212 to be connected to another computer and/or directly to a network, which is also connected to the device 201–204 whose L-tag is being read.

To read the L-tag, tag reading device 210, 212 sends an information request message to a device 201–204, in one embodiment. The device 201–204, in turn, invokes a software agent, which processes the request and returns the requested information to the tag reading device 210, 212, as will be described in more detail later. Tag reading device 210, 212 can then store the L-tag information locally, and/or it can send the L-tag information to an asset manager 220 via a hardwired link 234 or a wireless link 236.

Besides a tag reading device 210, 212, other devices also can request L-tag information from a device 201–204. For example, asset manager 220 can request L-tag information from a device 201–204 without an intervening tag reading device 210, 212. Such a request can be made, in various embodiments, over wireless links 250, hardwired links 252, and/or combinations of these types of links. The links between the asset manager 220 and the devices 201–204 can be direct, or intervening nodes (not illustrated) can exist between the asset manager 220 and the devices 201–204. Because asset manager 220 can request and receive L-tag information, asset manager 220 also can be considered an L-tag reading device.

Receipt of an L-tag information request message by a device 201-204 is an event that triggers the device 201-204 to send L-tag information to the requester. In some instances, which will be described more fully later, other types of triggering events can prompt a device 201–204 to send L-tag information to asset manager 220 or to another device. For example, but not by way of limitation, other triggering events include detection of a device configuration change, expiration of a time period, the occurrence of a particular time or date, and/or power-up or power-down of the device.

Asset manager 220 includes at least one processor 260, at least one storage medium 262, a user interface 264, and a communications interface 270. In embodiments where tag reading devices 210 and/or electronic devices 201–204 communicate with asset manager 220 over links that include a wired link to asset manager 220 (e.g., the Internet, a LAN, a WAN, etc.), communications interface 270 includes a wired network interface 266. In embodiments where tag reading devices 210 and/or electronic devices 201–204 communicate with asset manager 220 over links that include a wireless link to asset manager 220, communications interface 270 includes a wireless interface 268.

L-tag and/or P-tag information can be received over communications interface 270. In addition, L-tag information request messages can be sent by asset manager 220 over communications interface 270. These L-tag information request messages can be sent directly to devices 201–204, or they can be sent to tag reading devices 210, 212, which in turn retrieve the requested L-tag information from the devices 201–204. Asset manager 220 also can send P-tag ID request messages to tag reading devices 210, 212. The tag reading devices 210, 212, in turn, can read and return the P-tag IDs for one or more P-tags in proximity to the tag reading devices 210, 212.

Processor 260 is operable to perform a number of tasks. For example, but not by way of limitation, processor 260 maintains tracking records within storage medium 262, formulates information request and other messages, processes and stores received L-tag and P-tag information, provides stored tracking information to requesting devices, among other things. In addition, processor 260 responds to actions indicated by a system user, who invokes the actions by manipulating user interface 264.

User interface 264 can include, for example, a keyboard, pointing device, monitor, and/or other input/output devices. For example, a user may request, through user interface 264, that the asset manager 220 display a listing of all known electronic devices that have a certain hardware configuration, along with the current locations of those devices. Such a request will invoke the processor 260 to evaluate the hardware configuration information for the tracking records stored in storage medium 262, and to display the requested information. Numerous other types of requests can be made by a user, in various embodiments. These requests can be information retrieval requests or requests to perform certain L-tag and/or P-tag reading tasks. In other embodiments, various requests can be made by software agents within asset manager 220, without interaction with a human user.

Although only four electronic devices 201–204 and two tag reading devices 210, 212 are illustrated in FIG. 2, more or fewer of these elements can be included in a system. In addition, although only one asset manager 220 is illustrated, additional asset managers can be included in a system that provides asset management using a distributed management scheme.

More detailed descriptions of an electronic device (e.g., devices 201–204) and a tag reading device (e.g., tag reading devices 210, 212) will now be given.

Figure 3:
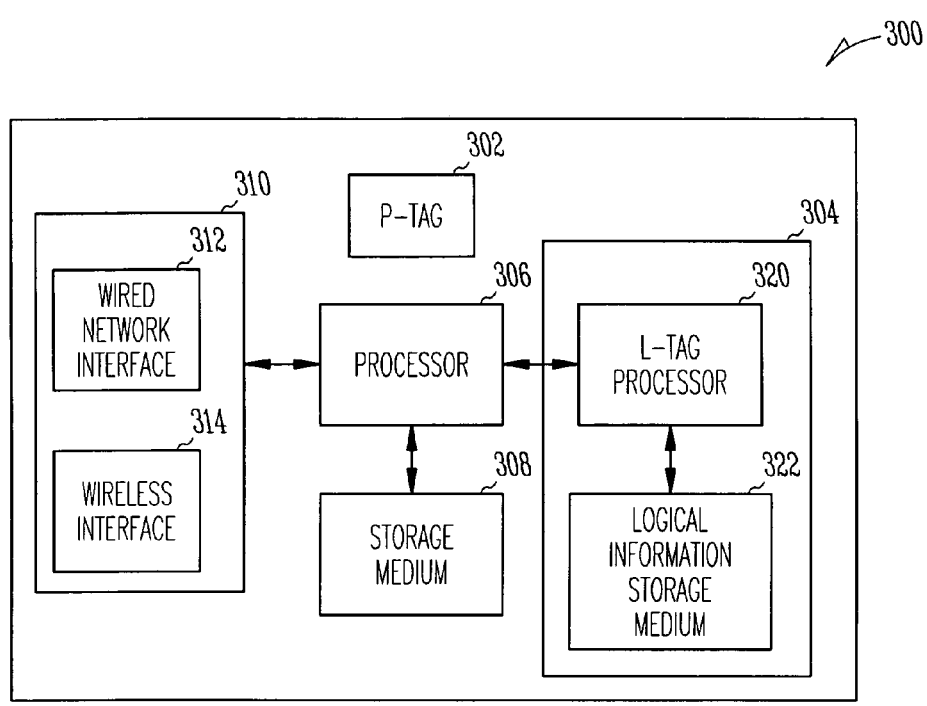
FIG. 3 is a simplified block diagram of a device that includes a physical-tag (P-tag) and a logical-tag (L-tag), in accordance with an embodiment of the invention.

FIG. 3 is a simplified block diagram of an electronic device 300 that includes at least one P-tag 302 and at least one L-tag 304, in accordance with an embodiment of the invention. Device 300 also includes at least one processor 306 and at least one storage medium 308.

As described previously, P-tag 302 includes at least one P-tag ID, which can be read by an RF signal or through magnetic or optical detection. In various embodiments, P-tag 302 can also include other P-tag information, such as other physical and/or logical attribute information. The P-tag 302 can be located so that it is either visible or not visible from the exterior of the device 300. Embodiments of a P-tag are described in more detail later.

In one embodiment, processor 306 runs the device's operating system and application programs, among other things. Programs and other information that are used by or produced by processor 306 are stored within storage medium 308.

Processor 306 also receives messages from and sends messages to a communications interface 310. In various embodiments, communications interface 310 includes either or both wired network interface 312 and wireless interface 314. The messages exchanged over communications interface 310 include, for example, logical information request messages, messages that include logical information and control messages. In some cases, processor 306 interacts with L-tag 304 to respond to and/or to produce these messages.

L-tag 304 includes an L-tag processor 320 and logical information storage medium 322, in one embodiment. Logical information storage medium 322 can be distinct from storage medium 308, or it can be located within the same device.

L-tag processor 320 is a distinct processing element from processor 306, in the illustrated embodiment. This serves the purpose of reducing the impact on L-tag 304 from system changes (e.g., operating system updates) that might corrupt the logical information stored within L-tag 304 or that might compromise the functionality of L-tag 304.

L-tag processor 320 is responsible for invoking one or more software agents to receive and store logical information within storage medium 322, and to retrieve logical information from storage medium 322 so that the information can be sent to a requester. For example, L-tag processor 320 may receive updated logical information produced by processor 306. The updated logical information can originate from a message received from a remote device (e.g., asset manager 220, FIG. 2), or it can originate from execution of a hardware and/or software detection program, in various embodiments. L-tag processor 320 causes the updated logical information to be stored within logical information storage medium 322, as will be described in more detail later.

L-tag processor 320 also retrieves logical information from logical information storage medium 322, in response to requests received from processor 306. For example, processor 306 may receive a request, over interface 310, for all or a portion of the device's logical information. Processor 306, in turn, passes this request on to L-tag processor 320. L-tag processor 320 then retrieves the requested information from storage medium 322, and it returns the information to processor 306. Processor 306 can then, in turn, return the information to the requester.

FIG. 3 illustrates an electronic device with a dedicated L-tag processor 320, which is responsible for invoking various software agents to access and maintain logical information within logical information storage medium 322. In an alternate embodiment, some or all of the various software agents associated with the L-tag can be implemented on another processor, such as processor 306, rather than including a separate processor such as L-tag processor 320.

P-tag 302 and L-tag 304 are readable by a P-tag reading device and an L-tag reading device, respectively. In one embodiment, a single tag reading device can include the ability to read both a P-tag and an L-tag. In other embodiments, a tag reading device can include the capability to read either a P-tag or an L-tag, but not both. For purposes of brevity, a device that includes the ability to read both a P-tag and an L-tag is described below.

Figure 4:
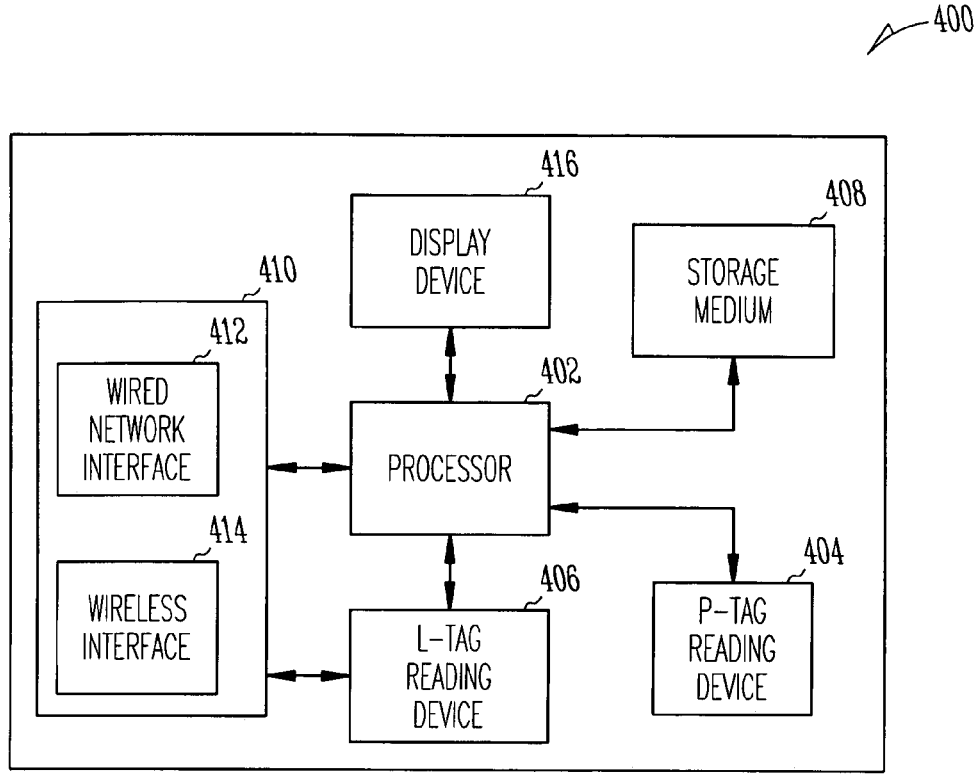
FIG. 4 is a simplified block diagram of a tag reading device, in accordance with an embodiment of the invention.

FIG. 4 is a simplified block diagram of a tag reading device 400, in accordance with an embodiment of the invention. Tag reading device 400 can be a stand-alone device, or it can form a portion of a larger device, such as a computer, for example. In embodiments where tag reading device 400 forms a portion of a larger device, some or all elements of tag reading device 400 can be used for other purposes (e.g., general purpose processing), and the device can include other major elements. Tag reading device 400 can be stationary, portable or mobile, in various embodiments.

Tag reading device 400 includes a processor 402, a P-tag reading device 404, and an L-tag reading device 406, in one embodiment. In other embodiments, tag reading device 400 includes either a P-tag reading device 404 or an L-tag reading device 406, but not both.

Tag reading device 400 can be activated to read one or more P-tags and/or L-tags in any of several ways. In one embodiment, an operator of tag reading device 400 can provide a user input indicating that the operator would like device 400 to read one or more P-tags or L-tags. In another embodiment, tag reading device 400 can receive one or more control messages via communications interface 410, which indicate that device 400 should initiate a scan for P-tags and/or L-tags within range of the device 400. In still other embodiments, a P-tag and/or L-tag reading process can be initiated based on the occurrence of a periodic event, expiration of a time period, an input from a motion detector or other sensor, or some other triggering event.

In response to one of the triggering events described above, processor 402 creates one or more control signals or commands, which processor 402 provides to P-tag reading device 404 and/or L-tag reading device 406. When processor 402 receives P-tag and/or L-tag information, processor 402 can store the information in storage medium 408, send the information to a remote device via communications interface 410, and/or display the information via display device 416.

P-tag reading device 404 includes hardware that enables device 404 to read a P-tag over an air interface. The specific hardware included in P-tag reading device 404 depends on the type of P-tag that device 404 is designed to read. For example, if P-tag reading device 404 is designed to read a magnetic P-tag, then device 404 includes a chain of components designed to detect and decode magnetic energy. If P-tag reading device 404 is designed to read a barcode or other visually represented P-tag, then device 404 includes an optical scanner.

In one embodiment, P-tag reading device 404 is designed to read an RFID P-tag. Accordingly, P-tag reading device 404 includes an antenna, a transceiver, and a decoder. The antenna emits radio frequency activation signals in ranges anywhere from one inch to 100 feet or more, depending upon its power output and the radio frequency used. When an RFID P-tag is located within the range of the tag reading device, the tag reading device detects and decodes data encoded in the RFID P-tag. The electromagnetic field produced by the P-tag reading device 404 can be constantly present (e.g., when multiple tags are expected continually or when the system wants to detect the presence of P-tags as they enter the range of the P-tag reading device 404). If constant interrogation is not desired, the field can be activated by a sensor device (e.g., a motion detector), periodically, or in response to receipt of a control signal.

In one embodiment, where writable P-tags (e.g., RFID P-tags) are used, P-tag reading device 404 also can be capable of writing data to a P-tag over the air interface. For example, but not by way of limitation, P-tag reading device 404 could initialize or modify a P-tag ID, and write other information to the P-tag as well. In one embodiment, P-tag reading device 404 can write various physical and/or logical attribute information to a P-tag. If such information is stored within the P-tag, then a P-tag reading device 404 can access logical information from the P-tag, rather than from another source. Desirably, the logical information stored within the P-tag represents the most-current logical information (e.g., the information is the same as the information stored within the L-tag). Although the term P-tag "reading" device is used herein, it is not meant to imply that the device is only capable of reading a P-tag. In the embodiment described in this paragraph, the device also is capable of writing to a P-tag.

L-tag reading device 406 includes hardware that enables device 404 to read an L-tag. An L-tag may be read over an air interface if the electronic device whose L-tag is being read supports wireless communications, such as a WLAN or Bluetooth connections, for example. Alternatively, an L-tag may be read over a wired network, such a LAN, WAN or the Internet, for example. Accordingly, L-tag reading device 406 is capable of communicating with an electronic device whose L-tag is being read via communications interface 410.

Communications interface 410 enables device 400 to communicate with an asset manager (e.g., asset manager 220, FIG. 2) and/or other remote devices. In various embodiments, communications interface 410 includes either or both wired network interface 412 and wireless interface 414. The messages exchanged over communications interface 410 include, for example, P-tag request messages, P-tag IDs, logical information request messages, messages that include logical information, and control messages.

Storage medium 408 can be used locally to store P-tag IDs that are read by P-tag reading device 404. In one embodiment, this P-tag information can later be downloaded for analysis by a remote processing device (e.g., asset manager 220, FIG. 2).

In one embodiment, the remote processing device also includes knowledge of the location of the tag reading device when a P-tag is read. For example, a tag reading device 400 could be a fixed reader, whose location does not change. Alternatively, in one embodiment, tag reading device 400 can include a mechanism whereby it can determine its location (e.g., a global positioning system (GPS) receiver or other triangulation system), and associate the location with a P-tag ID, when the P-tag ID is read.

Storage medium 408 also can be used to store L-tag IDs and logical information. The L-tag IDs and logical information can be loaded into storage medium 408 from an asset manager, in one embodiment. This enables the last-known L-tag information for a device to be displayed by display device 416, when a P-tag is read. Alternatively, L-tag IDs and logical information can be read from an L-tag associated with a device, if the tag reading device 400 includes an L-tag reading device 406. This information can be stored for later analysis by a remote processing device, and/or displayed via the display device 416.

As indicated previously, several types of P-tags can be used, in various embodiments. For example, but not by way of limitation, a P-tag can include a visual representation of a P-tag ID (e.g., a barcode), a magnetic storage element, or an RF readable storage element. The latter type of P-tag, referred to as an RFID P-tag, is used in one embodiment.

Figure 5:
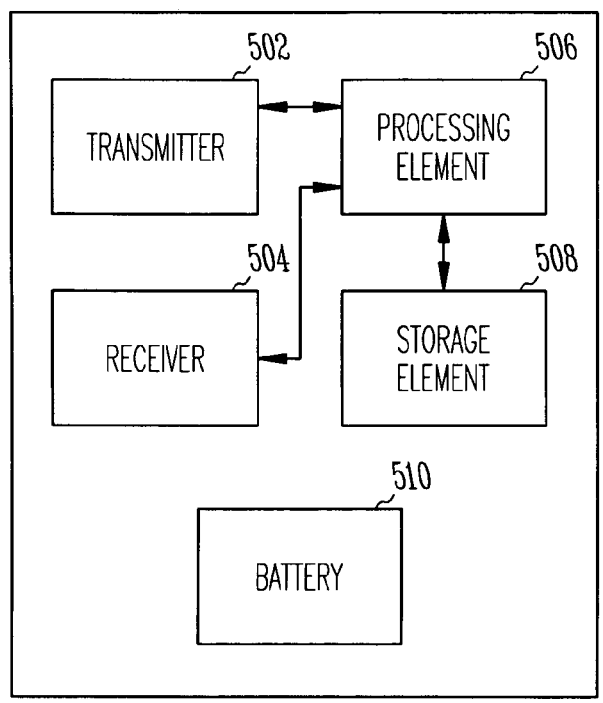
FIG. 5 is a simplified block diagram of a P-tag, in accordance with an embodiment of the invention.

FIG. 5 is a simplified block diagram of an RFID P-tag 500, in accordance with an embodiment of the invention. RFID P-tag 500 basically functions as a transponder. Accordingly, RFID P-tag 500 includes a transmitter 502, a receiver 504, a processing element 506, and a storage element 508. When receiver 504 receives an interrogation signal from a P-tag reading device (e.g., device 404, FIG. 4), processing element 506 retrieves an encoded identification signal from storage element 508, and it causes transmitter 502 to transmit the encoded identification signal. The encoded identification signal is a P-tag ID, in one embodiment.

Several types of RFID P-tags can be used, in various embodiments. An RFID P-tag can be passive or active, and it can be read-only or read-write capable. A passive RFID P-tag operates without a separate external power source, and it obtains operating power generated from the P-tag reading device. A read-only RFID P-tag typically is passive, and it is programmed with a unique set of data (e.g., 32 to 128 bits) that cannot be modified. This set of data is referred to herein as a "static P-tag ID."

A read-write capable RFID P-tag is typically active, and it operates with a separate external power source (e.g., battery 510). An active RFID P-tag can include a static P-tag ID and a "dynamic P-tag ID." In one embodiment, a dynamic P-tag ID is an identifier that can be written to or changed. In one embodiment, when a P-tag is read, the P-tag transmits the dynamic P-tag ID. In another embodiment, the P-tag transmits the static P-tag ID. In still another embodiment, the P-tag transmits both the static and the dynamic P-tag IDs.

A read-write capable RFID P-tag also can be used to store physical and/or logical attribute information, in one embodiment. This information can be written and/or read by a P-tag reading device (e.g., P-tag reading device 404, FIG. 4). For example, a P-tag reading device can write a version of the logical and/or physical attribute information within the RFID P-tag. In this embodiment, a P-tag reading device would then be able to access the stored version of the information, rather than accessing other versions of the information stored in the device's I-tag, in the asset manager, or in another device.

The system and devices described above can be used for asset-tracking purposes, in one embodiment. The term "asset" is broadly defined herein as an entity for which physical and/or logical attributes are being tracked. In one embodiment, the assets that are being tracked include electronic devices, such as those illustrated in FIG. 1. In other embodiments, other types of assets can be tracked, including non-electronic objects and animate objects. The use of the term "device" herein, when referring to an asset being tracked, is not meant to limit the scope of the inventive subject matter. Instead, the term "device" should be construed broadly to include non-electronic, animate, and other objects.

Logical attributes may include, for example, information regarding the asset owner and/or user, the asset's configuration, serial number, and device type. Other logical attributes also can be tracked, in various embodiments. Physical attributes include, for example, an asset's physical location. The physical location information can be roughly approximated by the location of a tag reading device that reads the asset's P-tag. Alternatively, the physical location information can be more precisely approximated by the location of the device itself. Other physical attributes also can be tracked, in various embodiments, such as a device's orientation, appearance, and other physical attributes.

In one embodiment, physical and/or logical attributes of an asset are maintained in an attribute database. The attribute database is centralized, in one embodiment, although the database can be distributed, as well. For each asset being tracked, a tracking record is maintained in the database.

Figure 6:
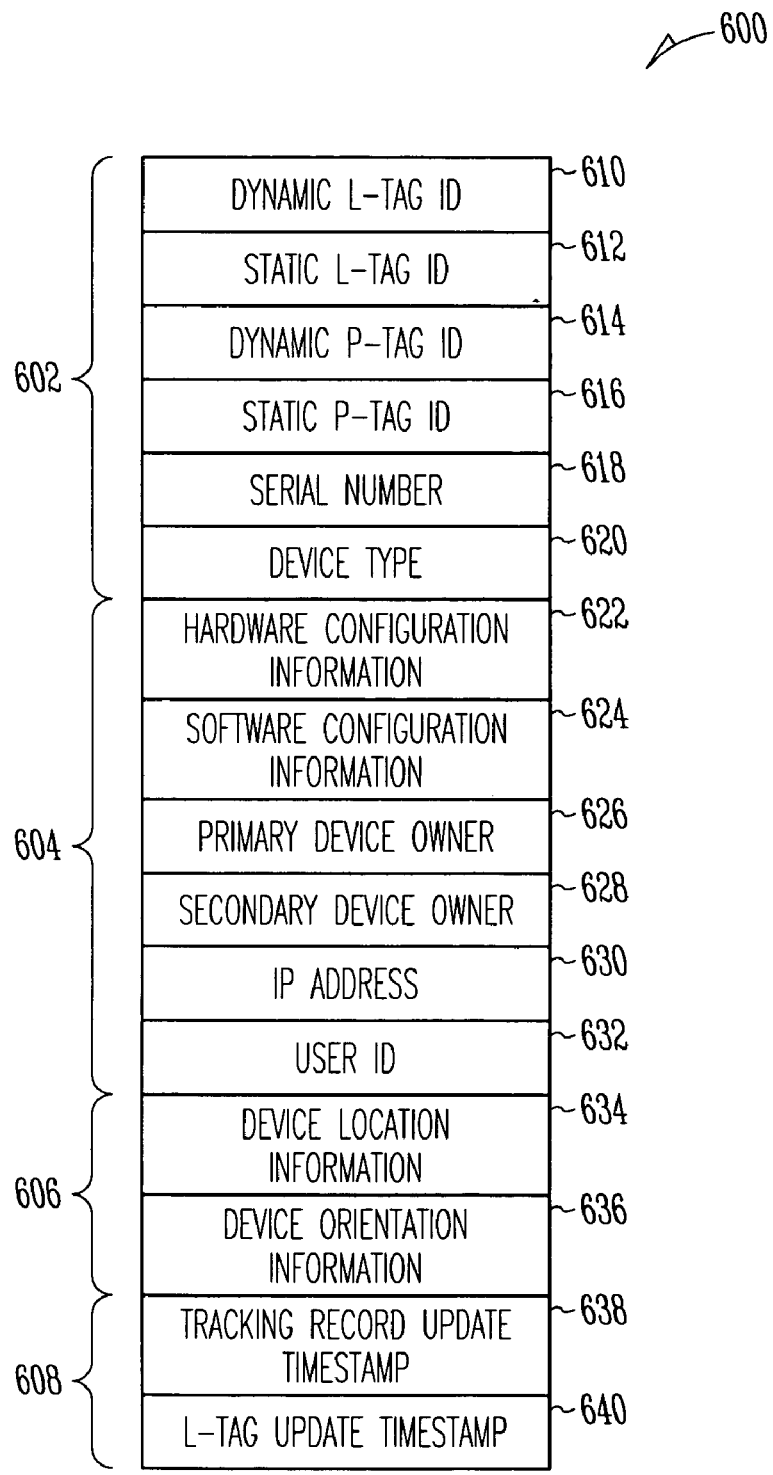
FIG. 6 is a simplified diagram of a tracking record, in accordance with an embodiment of the invention.

FIG. 6 is a simplified diagram of a tracking record 600, in accordance with an embodiment of the invention. Tracking record 600 includes one or more tag ID fields 602, logical attribute information fields 604, physical attribute information fields 606, and one or more timestamp fields 608, in one embodiment.

Tag ID fields 602 include L-tag ID fields 610, 612 and P-tag ID fields 614, 616, in one embodiment. As discussed previously, an L-tag or P-tag may include both a static value (e.g., a value that is assigned by the tag manufacturer, and which is not changeable) and a dynamic value (i.e., a value that can be created by the end-user, and which is changeable). Accordingly, in one embodiment, both the static and dynamic L-tag and P-tag IDs are stored within a tracking record for a device.

The dynamic L-tag ID field 610 includes a value that indicates the dynamic L-tag ID that is stored within the L-tag for the device. The static L-tag ID field 612 includes a value that indicates the static L-tag ID that is stored within the L-tag for the device. Similarly, the dynamic P-tag ID field 614 includes a value that indicates the dynamic P-tag ID that is stored within the P-tag for the device. And the static P-tag ID field 616 includes a value that indicates the static P-tag ID that is stored within the P-tag for the device. In alternate embodiments, a single L-tag ID and/or P-tag ID could be included in the tracking record for a device, rather than including both static and dynamic values.

Logical attribute information fields 604 include various logical attribute information. In one embodiment, logical attribute fields 604 include serial number field 618, device type field 620, hardware configuration information field 622, software configuration information field 624, primary device owner field 626, secondary device owner field 628, Internet protocol (IP) address field 630, and user ID field 632. In other embodiments, more, fewer, or different logical attribute fields can be included in the tracking record 600.

Serial number field 618 can include a manufacturer's serial number for the device, for example. Device type field 620 can indicate the type of device. For example, but not by way of limitation, device type field 620 can indicate that the device is a laptop computer, a cellular telephone, a plotter, and/or any of a number of various device types.

Hardware configuration information field 622 can include a description of the hardware associated with the device. For example, but not by way of limitation, hardware configuration information field 622 can indicate a processor type, memory capacity, memory type, types of communication ports, and/or any of a number of different hardware descriptions.

Software configuration information field 624 can include a description of the software associated with the device. For example, but not by way of limitation, software configuration information field 624 can indicate the types and versions of the operating system, application programs, browser programs, and/or any of a number of different software descriptions.

Primary device owner field 626 can indicate the primary owner of the device. For example, if the device is owned by a corporation, this field can indicate the corporation's name. Secondary device owner field 628 can indicate a secondary owner of the device, if any. For example, a secondary owner can be identified as an employee of the primary device owner identified in primary device owner field 626. In alternate embodiments, more or fewer than two owner fields can be included.

IP address field 630 can include an IP address for the device, if the device is a node that is accessible over a network. User ID field 632 can include an identity of a current user of the device.

The various fields included in the logical attribute information fields 604 can be substantially different from the fields listed above. It will be obvious to one of skill in the art that more, fewer or different logical attributes could be tracked by the system.

Physical attribute information field 606 includes a device location information field 634 and a device orientation field 636, in one embodiment. In one embodiment, location information field 634 can include an indicator of the last-known location of the device. The location can be represented in a number of different ways, and to varying degrees of accuracy. For example, in one embodiment, the last-known location can indicate the location of a tag reading device, which last read the P-tag for the device, and which sent information to the asset manager that enabled the asset manager to determine the tag reading device's location. In another embodiment, the last-known location could indicate a room or building within which the device's P-tag was last read. In still another embodiment, the last-known location could include more precise location information, such as coordinates obtained using GPS or another triangulation method.

Device orientation field 636 can include an indicator of the last-known orientation of the device. The orientation can be represented in a number of different ways, and to varying degrees of accuracy. For example, but not by way of limitation, the orientation can be represented in terms of angle vectors within a two- or three-dimensional coordinate system. Information regarding a device's orientation may be irrelevant in some systems. Accordingly, this field, among others, may be excluded from the tracking record 600 in some embodiments.

Timestamp fields 608 include a tracking record update timestamp 638 and an L-tag update timestamp 640, in one embodiment. The tracking record update timestamp 638 can indicate a time when the tracking record 600 was last updated. The L-tag update timestamp 640 can indicate a time when the device's L-tag was last updated. Discrepancies between the values between the tracking record update time and the L-tag update time can indicate that the asset manager should send updated information to the L-tag.

The tracking record 600 of FIG. 6 includes specific fields arranged in a specific order. In alternate embodiments, more, fewer, and different fields can be included in a tracking record, and the fields can be arranged in different orders.

Information can be entered within the various fields of tracking record 600 in several different ways, in one embodiment. When a tracking record is initially created, a human user can manually enter known information via a user interface that enables the user to access the record. For example, a user can enter values into fields such as the tag ID fields 602, serial number field 618, device type field 620, hardware configuration information field 622, software configuration information field 624, primary device owner field 626, secondary device owner field 628, and IP address field 630.

The asset-tracking system also can create values for certain ones of the fields. For example, the asset-tracking system can include a program for assigning dynamic L-tag IDs and dynamic P-tag IDs, and the system can create values for fields 610 and 614, accordingly. The system also can automatically update the tracking record update timestamp field 638 whenever a change is made to selected fields of the tracking record.

Tag ID fields 602 also can be initially filled in and/or updated when P-tag and L-tag information is received from a tag reading device. In one embodiment, when an L-tag reading device returns L-tag information to the asset manager for inclusion in a tracking record, the L-tag reading device also returns an L-tag update timestamp indicating a time when the L-tag information was last updated. This information can be included by the asset manager in L-tag update timestamp field 640.

The various fields within a tracking record 600 can be initially filled in and/or updated at times and in ways other than the times and ways described above. The above description is for purposes of illustration and not of limitation.

Figure 7:
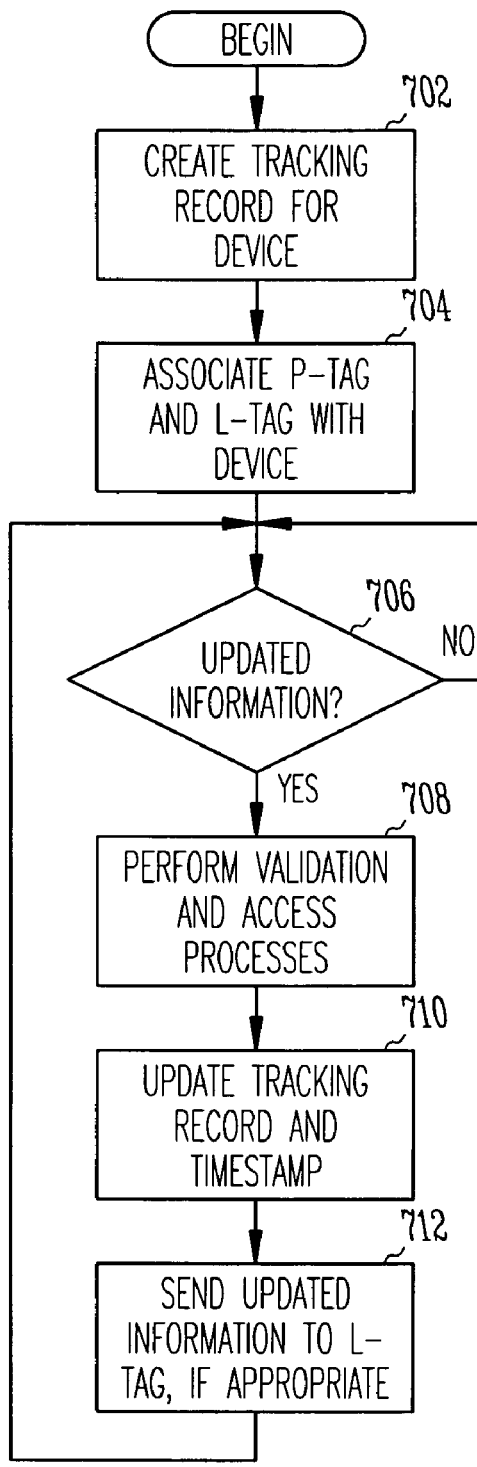
FIG. 7 is a flowchart of a method for creating and updating a tracking record in an attribute database, in accordance with an embodiment of the invention.

FIG. 7 is a flowchart of a method for creating and updating a tracking record (e.g., tracking record 600, FIG. 6) in an attribute database, in accordance with an embodiment of the invention. The method begins, in block 702, by associating a P-tag and an L-tag with a device that will be tracked.

A P-tag can be permanently, semi-permanently, or removably attached to an outside surface of the device. If the P-tag is readable using magnetic or RF signals, then the P-tag can be located below the exterior surface of the device. In one embodiment, a writable P-tag is used, which enables a dynamic P-tag ID to be stored within the P-tag.

An L-tag is located within the device, in one embodiment. The L-tag can be associated with the device by installing one or more software agents that will be executed by a general or special purpose processor within the device. Alternatively, the L-tag can include dedicated hardware and software that is distinct from the device's core processor. A dynamic L-tag ID can be stored within the L-tag when the device is powered. The dynamic L-tag ID can be entered directly into the device through a user interface, or it can be sent to the device over a wired or wireless connection.

In block 704, a new tracking record is created for the device being tracked. In one embodiment, the new tracking record is included with a plurality of tracking records that are stored within an attribute database. Each tracking record corresponds to a device whose attributes are being tracked.

Each tracking record includes a plurality of fields, as described above in conjunction with FIG. 6. The field types depend on the type of attributes that the system is tracking. The various fields can be filled in at different times. When a tracking record is created, known information can be entered into some fields. For example, if the L-tag and P-tag IDs are known when the record is created, this information can be entered. Entry of tracking record information is discussed in more detail above.

After a tracking record has been created, updated information can be received, in block 706. Updated information can come from a variety of sources. For example, updated information can be received when a user having access to the asset manager enters updated information through a user interface. For example, a user can enter new owner information, when the device's owner changes. Alternatively, a user can enter new configuration information, when the hardware or software configuration is changed. Updated information also can originate from the device itself, from its L-tag, and/or from a tag reading device.

When updated information is received, then in block 708, validation and access processes are performed, in one embodiment. During these processes, the system determines whether the updated information is valid (e.g., the values are in the proper format and ranges), and whether access privileges are granted to the source of the updated information.

Assuming that the information is valid and that access is granted, then in block 710, the tracking record is updated with the received information. In one embodiment, the tracking record update timestamp (e.g., timestamp 638, FIG. 6) is also updated to reflect the then-current time.

If the updated information is information that is included in the L-tag, and the L-tag was not the source of the information, then the updated information is sent to the L-tag, in block 712. This enables the L-tag to update its L-tag information so that it is consistent with the tracking record within the database. The method then iterates as shown.

The data structure within the L-tag itself can include some or all of the same fields and information as the device's tracking record maintained within the asset manager. In one embodiment, the information within an L-tag is a subset of the information within a tracking record for the device.

Figure 8:
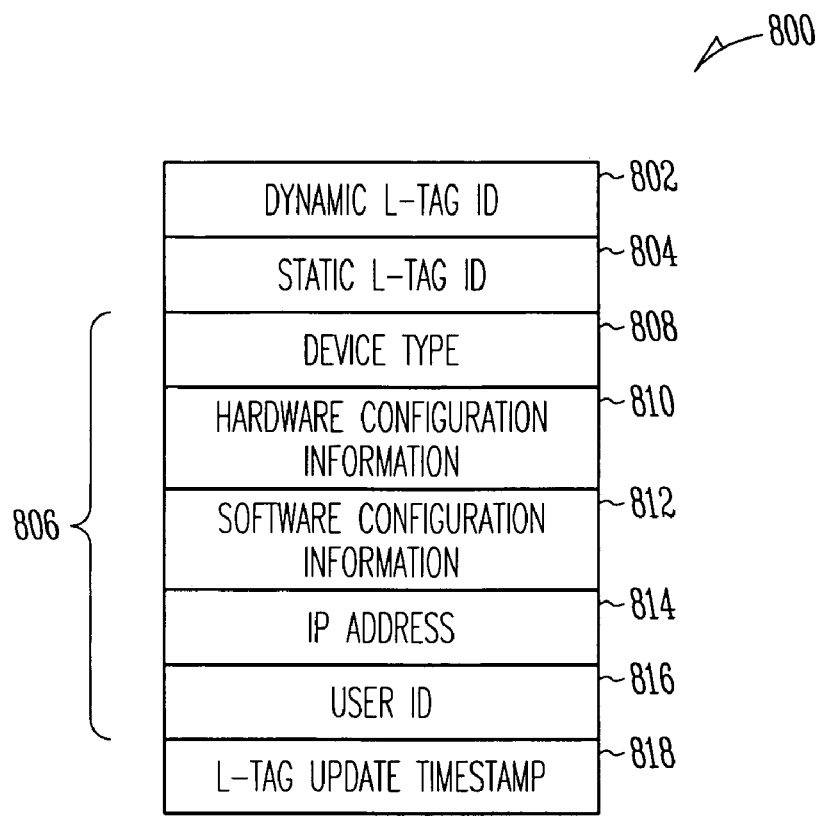
FIG. 8 is a simplified diagram of an L-tag data structure, in accordance with an embodiment of the invention.

FIG. 8 is a simplified diagram of an L-tag data structure 800, in accordance with an embodiment of the invention. The L-tag data structure 800 is stored in a logical information storage medium (e.g., medium 322, FIG. 3) that is separate and distinct from the device's memory, in one embodiment. In another embodiment, the L-tag data structure 800 is stored in a portion of the device's memory or in another storage medium that is accessible to the software agents associated with the L-tag.

The L-tag data structure 800 includes L-tag ID fields 802, 804, a number of additional fields that include logical attribute information for the device 806, and L-tag update timestamp field 818, in one embodiment.

In one embodiment, two L-tag ID fields 802, 804 are included in the L-tag data structure 800. The dynamic L-tag ID field 802 includes a value that indicates the dynamic L-tag ID that is stored within the L-tag for the device. The static L-tag ID field 804 includes a value that indicates the static L-tag ID that is stored within the L-tag for the device. In an embodiment, a single L-tag ID could be included in the L-tag data structure 800, rather than including both static and dynamic values.

Logical attribute information fields 806 include various logical attribute information. In one embodiment, logical attribute information fields 806 include device type field 808, hardware configuration information field 810, software configuration information field 812, IP address field 814, and user ID field 816. In other embodiments, more, fewer, or different logical attribute fields can be included in the L-tag data structure 800.

Hardware configuration information field 810 can include a description of the hardware associated with the device. For example, but not by way of limitation, hardware configuration information field 810 can indicate a processor type, memory capacity, memory type, types of communication ports, and/or any of a number of different hardware descriptions.

Software configuration information field 812 can include a description of the software associated with the device. For example, but not by way of limitation, software configuration information field 812 can indicate the types and versions of the operating system, application programs, browser programs, and/or any of a number of different software descriptions.

IP address field 814 can include an IP address for the device, if the device is a node that is accessible over a network. User ID field 816 can include an identity of a current user of the device.

The various fields included in the logical attribute information fields 806 can be substantially different from the fields listed above. It will be obvious to one of skill in the art that more, fewer or different logical attributes could be tracked by the system.

L-tag update timestamp field 818 can indicate a time when the information within the L-tag data structure 800 was last updated. The L-tag data structure 800 of FIG. 8 includes specific fields arranged in a specific order. In alternate embodiments, more, fewer, and different fields can be included in an L-tag data structure, and the fields can be arranged in different orders.

Information can be entered within the various fields of L-tag data structure 800 in several different ways, in one embodiment. When an L-tag is initially installed in association with a device, a human user can manually enter known information via a user interface that enables the user to access the data structure. For example, a user can enter values into fields such as the L-tag ID fields 802, 804, device type field 808, hardware configuration information field 810, software configuration information field 812, and IP address field 814.

The L-tag also can create values for certain ones of the fields. For example, the L-tag can include a software agent that is capable of detecting and storing the hardware configuration information and software configuration information within fields 810, 812, respectively. In addition, the L-tag can include a software agent that examines the device's software stack to determine such things as the IP address and the user ID. The L-tag can store these values within their respective L-tag data structure fields 814, 816. The L-tag also can include a software agent capable of automatically updating the L-tag update timestamp field 818 whenever a change is made to selected fields of the L-tag data structure 800.

The various fields within L-tag data structure 800 can be initially filled in and/or updated at times and in ways other than the times and ways described above. The above description is for purposes of illustration and not of limitation.

Figure 9:
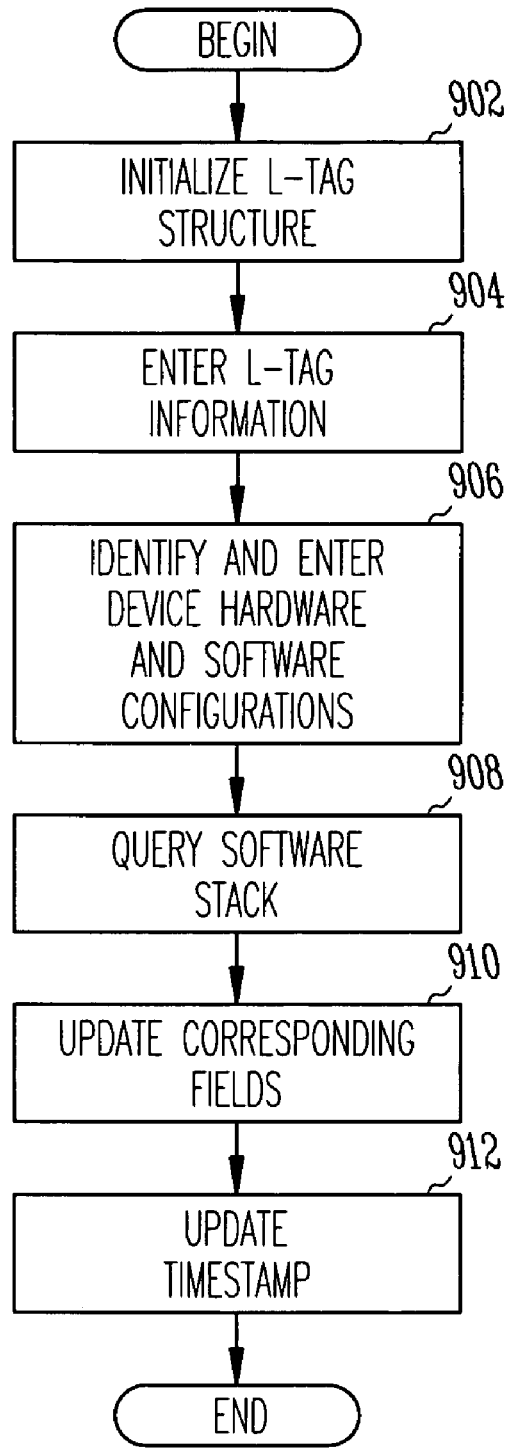
FIG. 9 is a flowchart of a method for initializing an L-tag data structure within a device, in accordance with an embodiment of the invention.

FIG. 9 is a flowchart of a method for initializing an L-tag data structure within a device, in accordance with an embodiment of the invention. In one embodiment, the method is carried out substantially by an L-tag within an electronic device (e.g., L-tag 304, FIG. 3).

The method begins, in block 902, by initializing an L-tag data structure (e.g., structure 800, FIG. 8), within the device. In one embodiment, the data structure is initialized by allocating a portion of a dedicated storage medium (e.g., logical storage medium 322, FIG. 3) for the L-tag data structure.

In block 904, L-tag ID information is entered into the data structure. For example, in one embodiment, a static L-tag ID value is entered into a static L-tag ID field (e.g., field 804, FIG. 8) and a dynamic L-tag ID value is entered into a dynamic L-tag ID field (e.g., field 806, FIG. 8). In one embodiment, these fields are filled in at different times and by different entities. For example, the static L-tag ID field can be filled in by an L-tag manufacturer. In one embodiment, the static L-tag ID is permanent, and it cannot be overwritten. The dynamic L-tag ID field is writable, in one embodiment, and it can be filled in manually by an individual. Accordingly, the individual may assign a dynamic L-tag ID and fill in this field when the device is set up to be tracked within the system. The device type field (e.g., field 806) also can be manually filled in.

In block 906, various hardware and software configuration information are identified and entered into the hardware configuration information field (e.g., field 810) and the software configuration information field (e.g., field 812), respectively. The hardware and software configuration information can be identified and entered in a number of ways. In one embodiment, the information can be manually entered. In another embodiment, the information can be received by a remote source, such as an asset manager, which includes a tracking record with that information. In still another embodiment, the device can execute one or more software agents to detect the hardware and/or software configuration on the device.

In one embodiment, a software agent is executed to query the device's software stack, if it has one, in block 908. This query can produce certain logical information, such as an IP address and/or user ID, for example. In block 910, L-tag data structure fields (e.g., fields 814, 816) corresponding to the identified information are updated.

In block 912, the L-tag update timestamp (e.g., timestamp 818) is updated to indicate a time when the L-tag data structure was initialized. The method then ends.

After the L-tag data structure has been initialized, the logical attributes of the device may occasionally change. For example, a new version of the operating system can be loaded onto the device, the memory can be upgraded, and various other logical attribute changes can occur. When logical attribute changes occur, the L-tag data structure can be updated to reflect the changes.

In one embodiment, the L-tag invokes a software agent to check the logical attributes of the device when certain triggering events occur. If any one or more of the attributes has changed, the L-tag updates the L-tag data structure.

Figure 10:
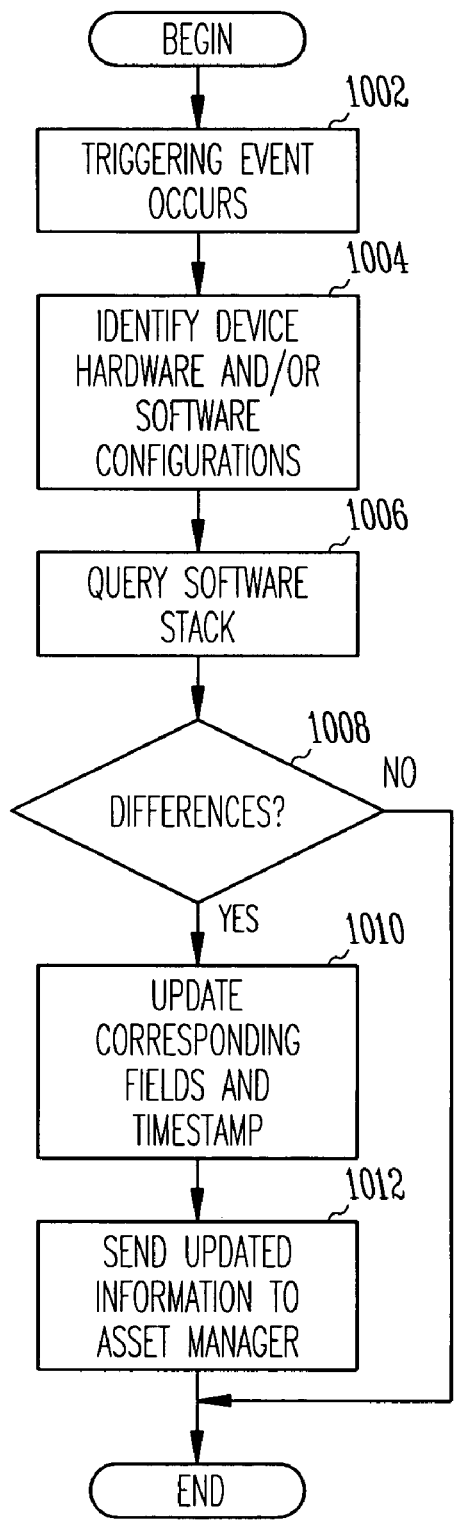
FIG. 10 is a flowchart of a method for updating an L-tag data structure within a device, in accordance with an embodiment of the invention.

FIG. 10 is a flowchart of a method for updating an L-tag data structure within a device, in accordance with an embodiment of the invention. In one embodiment, the method is carried out substantially by an L-tag within an electronic device (e.g., L-tag 304, FIG. 3).

The method begins, in block 1002, when a triggering event occurs. A triggering event is an event that invokes the L-tag to determine whether any logical changes have occurred within the device. Several types of events can be considered triggering events. For example, in one embodiment, boot-up of the system is a triggering event that causes the L-tag to check for logical attribute changes. In another embodiment, the device can receive a control input from a device user and/or from a remote source (e.g., an asset manager), which indicates that the L-tag should perform a check to see if logical attribute changes have occurred. Other triggering events could be imagined by one of skill in the art, based on the description herein.

If a triggering event has occurred, the L-tag invokes one or more software agents to identify device hardware and/or software configuration changes, if any, in block 1004. In addition, in block 1006, the L-tag invokes one or more software agents to query the software stack to identify other logical changes.

A determination is made, in block 1008, whether the L-tag has detected any differences between the logical attributes identified in blocks 1004 and 1006 and the logical attribute information stored within the L-tag data structure (e.g., structure 800, FIG. 8). If no differences are detected, the method ends.

If differences are detected, then the L-tag updates the corresponding fields within the L-tag data structure with the new logical attribute information, in block 1010. In addition, the L-tag updates the L-tag update timestamp field (e.g., timestamp field 818, FIG. 8) to reflect the time when the update occurred.

In one embodiment, where the logical attribute information is managed by an asset manager, the L-tag causes the updated logical attribute information to be sent to the asset manager, in block 1012, along with the L-tag update timestamp. This enables the asset manager to update the tracking record with the new information. The method then ends.

In some embodiments, the L-tag data structure can include logical or other information that is not detectable by the L-tag. For example, but not by way of limitation, the L-tag data structure can include fields identifying the device's primary and/or secondary owners, along with other information. Accordingly, in one embodiment, it is possible for the L-tag to receive logical or other information from a source outside the L-tag. As long as the source is legitimate, and the data is valid, the L-tag can update the various fields within the L-tag data structure, in one embodiment. If the source is a source other than the asset manager, then the L-tag can cause the updated information to be sent to the asset manager, to be reflected in the tracking record for the device.

As the above discussion indicates, logical information can be resident in a data structure managed by the L-tag, and in a tracking record maintained by an asset manager. In various instances, it may be desirable to access the logical information for a device, either from the device itself or from an asset manager. For example, an individual may desire to read a device's P-tag using a P-tag reading device, and be able to view logical attribute information regarding the device (e.g., the device owner, the hardware or software configuration, etc.).

Figure 11:
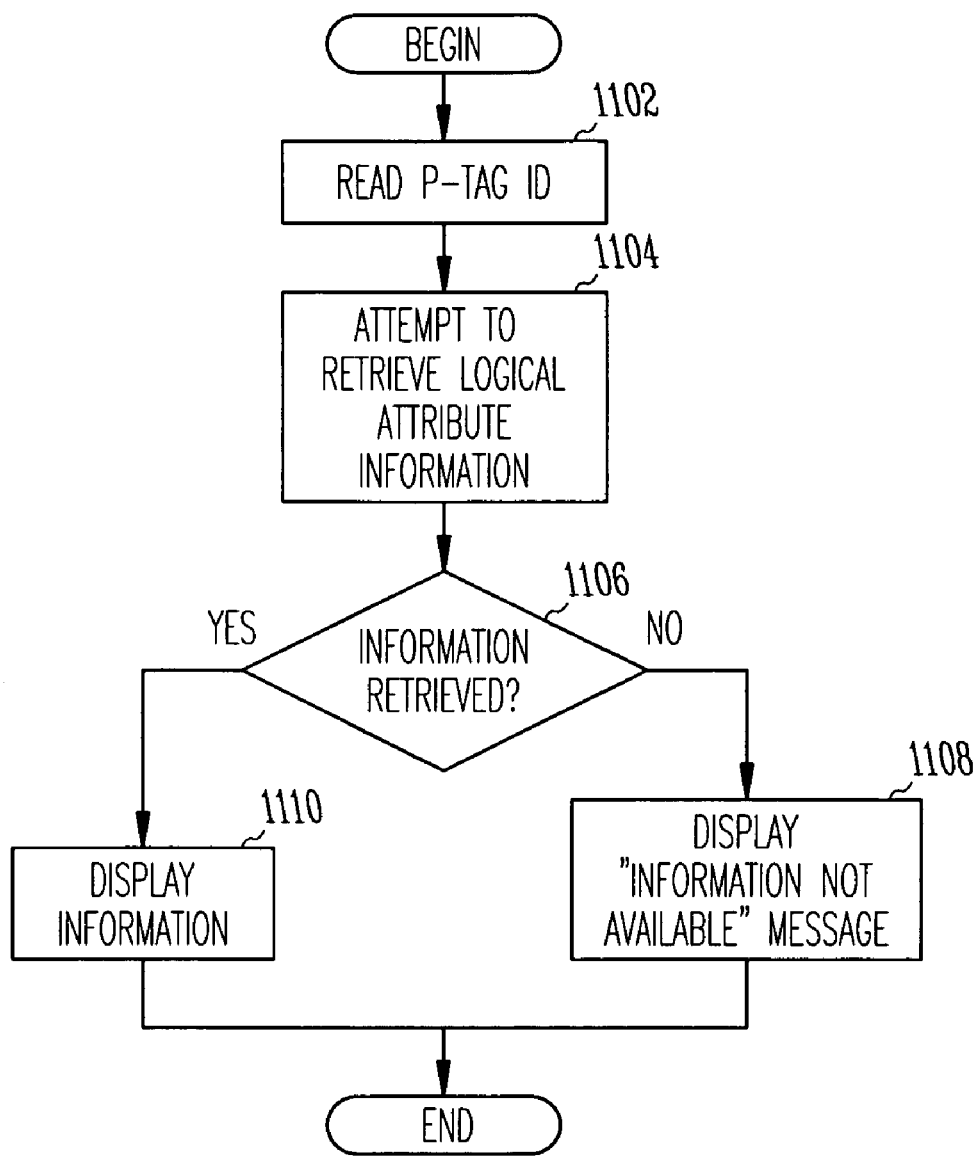
FIG. 11 is a flowchart of a method for scanning a P-tag, requesting logical information, and displaying received information, in accordance with an embodiment of the invention.

FIG. 11 is a flowchart of a method for reading a P-tag, requesting logical information, and displaying received information, in accordance with an embodiment of the invention. In one embodiment, the method is carried out substantially by a tag reading device (e.g., device 400, FIG. 4).

The method begins, in block 1102, by reading a P-tag ID from a P-tag associated with a device. As described previously, the P-tag can include an RFID P-tag, a magnetic P-tag, or a P-tag that includes a barcode or other visually-represented ID. The technique for reading the P-tag ID depends on the type of P-tag being read.

Using the P-tag ID, an attempt to retrieve selected logical attribute information for the device is made, in block 1104. In one embodiment, an information request message, which includes the P-tag ID, is sent over a wired or wireless link to a remote device that includes the logical attribute information. For example, an information request message can be sent to an asset manager.

In another embodiment, logical information for selected devices can be stored locally within the tag reading device. If a record corresponding to the P-tag ID is stored locally within the tag reading device, then the logical attribute information within the record can be accessed.

In another embodiment, logical information for the device can be stored in the devices P-tag. In such an embodiment, the tag reading device is capable of reading the logical information using a P-tag reading device.

In still another embodiment, the tag reading device can attempt to read the L-tag directly, by establishing communications with the device (e.g., over a Bluetooth connection or a wired or wireless network connection). In such an embodiment, the tag reading device includes an L-tag reading device (e.g., device 406, FIG. 4) in addition to a P-tag reading device (e.g., device 404, FIG. 4).

A determination is made, in block 1106, whether the requested logical attribute information was retrieved. If not, it could indicate that the device corresponding to the P-tag is not known to the tag reading device and/or the asset manager, or that the tag reading device is not granted access to the requested information. In one embodiment, if the information is not retrieved, then the device displays an "information not available" (or similar) message, in block 1108, and the method ends.

If the requested information is retrieved, then the tag reading device displays the information, in block 1110. The information can be displayed in its entirety, or it can be displayed in portions through a scrolling mechanism. After displaying the desired information, the method ends.

As indicated above, a tag reading device can request information from an asset manager, in one embodiment. This information can include logical attribute information and/or other information within a tracking record.

Figure 12:
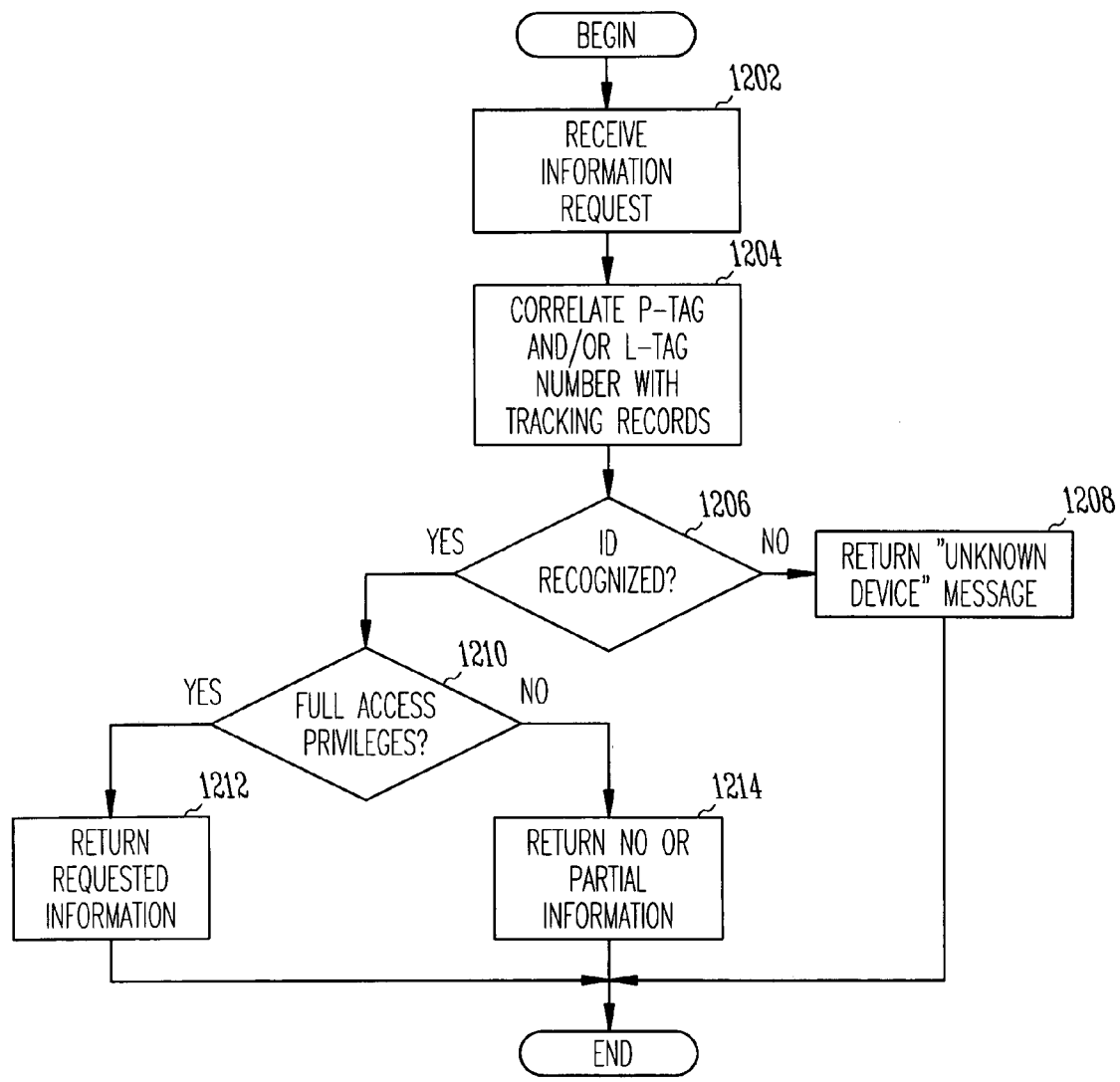
FIG. 12 is a flowchart of a method for an asset manager to respond to a request for information within a tracking record, in accordance with an embodiment of the invention.

FIG. 12 is a flowchart of a method for an asset manager to respond to a request for information within a tracking record, in accordance with an embodiment of the invention. In one embodiment, the method is carried out substantially by an asset manager (e.g., asset manager 220, FIG. 2).

The method begins, in block 1202, when the asset manager receives an information request message from a requesting device. In one embodiment, the information request message includes a P-tag ID and/or an L-tag ID. A requesting device can be, for example, a tag reading device, an electronic device that is being tracked, or another device, in various embodiments.

In block 1204, the asset manager correlates the received P-tag or L-tag ID with the tracking records being maintained by the asset manager, in order to identify the tracking record associated with the desired information.

A determination is made, in block 1206, whether the P-tag ID or L-tag ID is recognized. The ID is recognized if it corresponds with a tracking record within the database. If the ID is not recognized, then an "unknown device" message is returned to the requesting device, in block 1208, and the method ends.

If the P-tag ID or L-tag ID is recognized, then a determination is made, in block 1210, whether the requesting device has full access privileges to receive the requested information. A requesting device can have varying levels of access privileges, which indicate that the requesting device is authorized to access all or certain portions of the attribute information, or no information at all.

If the requesting device has full access privileges, then the requested information is returned to the requesting device, in block 1212. If the requesting device does not have full access privileges, then in block 1214 none of the requested information is returned, or only portions of the requested information to which the requesting device has access are returned. The method then ends.

As described earlier, in one embodiment, tag reading devices can be used to enable an asset-tracking system to determine the physical locations of a plurality of devices being tracked. In one embodiment, the location of a device is identified as a location of a tag reading device that detects the device being tracked.

Figure 13:
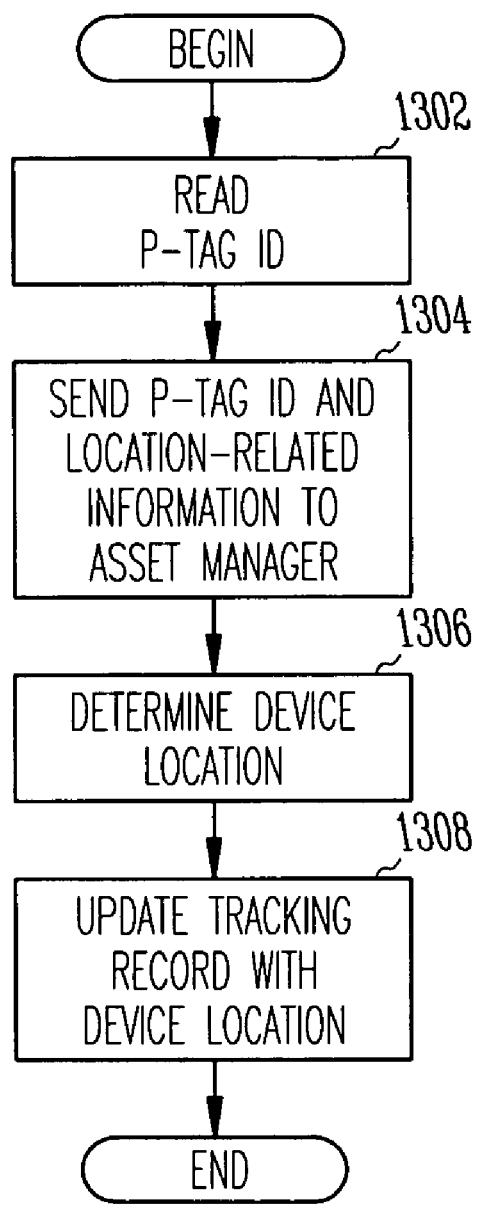
FIG. 13 is a flowchart of a method for reading a P-tag and sending information to an asset manager, which enables the asset manager to determine a location of the P-tag, in accordance with an embodiment of the invention.

FIG. 13 is a flowchart of a method for reading a P-tag and sending information to an asset manager, which enables the asset manager to determine a location of a device, in accordance with an embodiment of the invention. In one embodiment, the method is carried out substantially by a tag reading device (e.g., device 400, FIG. 4) and an asset manager (e.g., manager 220, FIG. 2).

The method begins, in block 1302, by reading a P-tag ID from a P-tag associated with a device. As described previously, the P-tag can include an RFID P-tag, a magnetic P-tag, or a P-tag that includes a barcode or other visually-represented ID. The technique for reading the P-tag ID depends on the type of P-tag being read.

In block 1304, the tag reading device sends the P-tag ID to an asset manager over a wired or wireless link. In addition, in one embodiment, the tag reading device sends location-related information to the asset manager, which enables the asset manager to determine a location of the tag reading device, and thus an approximate location of the device being tracked. The location-related information can take any of a variety of forms.

In one embodiment, the location-related information can include coordinates of the tag reading device. In another embodiment, the location-related information can include a location code, which the asset manager can use to determine the tag reading device's location. If the asset manager already has knowledge of the locations of the various tag reading devices within the system (e.g., in a system where the tag reading devices are fixed), then the tag reading device can include a tag reading device ID to identify itself, in another embodiment. The asset manager can correlate the tag reading device ID with its tag reading device location information in order to determine the approximate location of the device for which the P-tag is being read. In still another embodiment, information regarding the location of the tag reading device or the actual device being tracked can be ascertained and sent to the asset manager.

In block 1306, the asset manager determines the approximate location of the tag reading device and/or the device being tracked, based on the information provided by the tag reading device. In block 1308, the location information field (e.g., field 634, FIG. 6) of the tracking record is updated to indicate the approximate physical location of the device. The method then ends.

From time to time, an asset manager may want to actively obtain L-tag information from one or more devices being tracked. In one embodiment, this is accomplished by the asset manager sending an information request to a device, and receiving the requested information in return.

Figure 14:
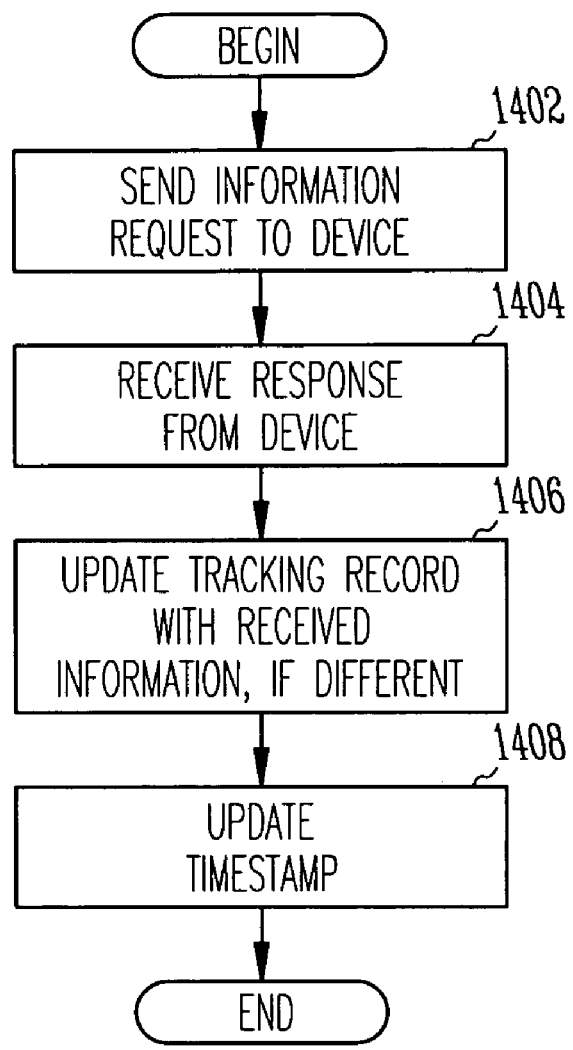
FIG. 14 is a flowchart of a method for an asset manager to request and receive L-tag information from a device, in accordance with an embodiment of the invention.

FIG. 14 is a flowchart of a method for an asset manager to request and receive L-tag information from a device, in accordance with an embodiment of the invention. In one embodiment, the method is carried out substantially by an asset manager (e.g., manager 220, FIG. 2).

The method begins, in block 1402, when the asset manager creates and sends an information request to a device. In various embodiments, the information request can be sent over wired and/or wireless connections between the asset manager and the device.

Assuming that the device receives and appropriately processes the request, asset manager receives a response from the device, in block 1404. The response can include various logical and/or other information from the device's L-tag.

In block 1406, the asset manager can update various fields of the tracking record associated with the device, when the received information is different from the information stored within the tracking record. The asset manager then updates the tracking record update timestamp (e.g., field 638, FIG. 6), in block 1408, to indicate the time that the tracking record is updated. The method then ends.

Figure 15:
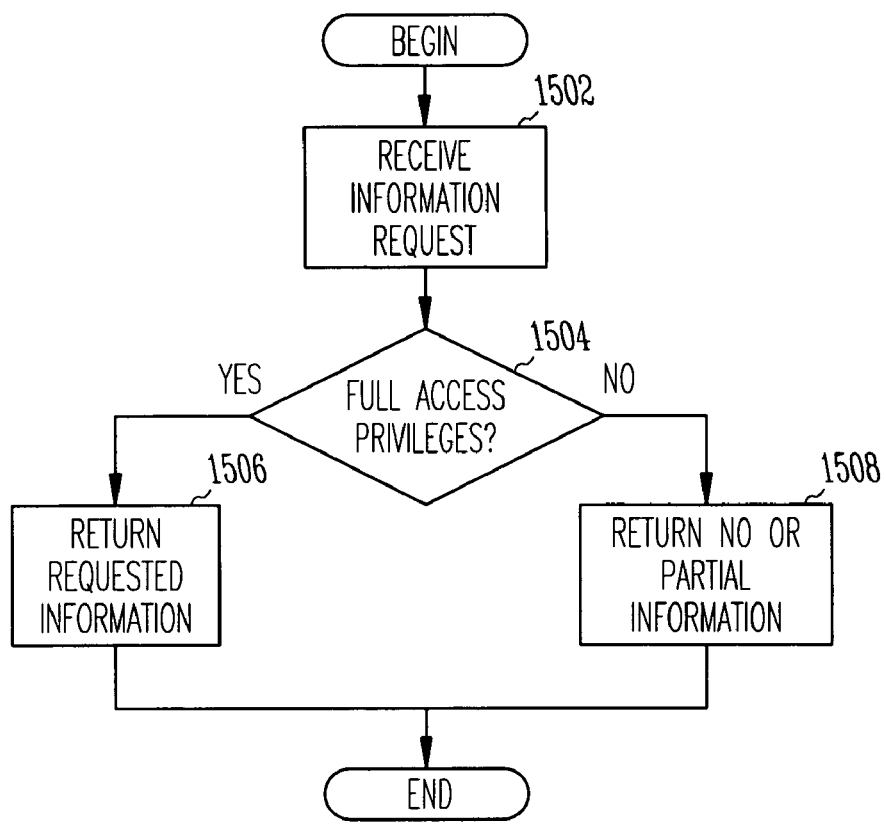
FIG. 15 is a flowchart of a method for receiving a request for L-tag information and returning the L-tag information, in accordance with an embodiment of the invention.

FIG. 15 is a flowchart of a method for receiving a request for L-tag information and returning the L-tag information, in accordance with an embodiment of the invention. In one embodiment, the method is carried out substantially by an L-tag (e.g., L-tag 304, FIG. 3).

The method begins, in block 1502, when an L-tag receives a request for L-tag information. The requester can be an asset manager, a tag reading device, or another device, in various embodiments.

In block 1504, a determination is made whether the requesting device has full access privileges to receive the requested L-tag information. A requesting device can have varying levels of access privileges, which indicate that the requesting device is authorized to access all or certain portions of the L-tag information, or no information at all.

If the requesting device has full access privileges, then the requested information is returned to the requesting device, in block 1506. If the requesting device does not have full access privileges, then in block 1508 none of the requested information is returned, or only portions of the requested information to which the requesting device has access are returned. The method then ends.

Thus, various embodiments of methods, apparatus, and systems have been described which enable the physical and/or logical attribute information for a plurality of electronic devices to be maintained and used. Although the detailed description tends to describe a system in which various computing and communications devices are tracked, embodiments of the invention also could be used, for example, to track fleets of vehicles, items being shipped from point to point, and even people or animals, as long as a P-tag and an L-tag can be supported by these entities.

Numerous applications for the embodiments of the invention are apparent. The various applications enable a human or computerized asset manager to maintain accurate knowledge of the locations, capabilities, and logical information for a group of assets being tracked. Several example applications are listed below. These include:

One or more tag reading devices can be located within a room. A tag reading device can attempt to read P-tags and/or L-tags associated with electronic devices within the room on a periodic or continuous basis, or in response to a command signal or message. The tag reading device can store the P-tag and/or L-tag information, and/or send the information to a remote processing device. The remote processing device can correlate the P-tag information with information regarding the location of the tag reading device, and also with L-tag and other logical information.

One or more tag reading devices can be carried through a facility by hand or on a mobile robot or cleaning cart. The tag reading devices can store P-tag and/or L-tag information that comes within range of the tag reading device, for later access by a remote processing device. Alternatively, the tag reading devices can provide the P-tag and/or L-tag information to the remote processing device via a wireless connection.

P-tags and L-tags can be associated with a group of items for which asset tracking is desired. These items can include computing-devices, other electronic devices, non-electronic devices, vehicles, and virtually any other group of items. When any one of the items passes through a passage point (e.g., a doorway, freeway corridor, airport, border, etc.), the P-tag is scanned. The P-tag information is stored along with information indicating the location of the P-tag reading device and various logical information. This enables approximate or precise location information to be maintained for the items being tracked. If items enter or leave a target area, the system can provide notification to that effect. This provides detection of theft and/or unauthorized movement of tracked items.

Using a tag reading device, security personnel can scan the P-tags of all items that are entering or exiting a facility. The tag reading device can display owner information or other logical information that enables the security personnel to determine whether the person carrying the item has the authority to move the item into or out of the facility. For example, if the name on the carrier's badge does not match the owner information, then the security personnel can take further action to determine whether the item can be moved.

The above example applications are not meant to limit the scope of the inventive subject matter. Those of skill in the art could imagine other applications for the various disclosed embodiments.

The foregoing description of specific embodiments reveals the general nature of the inventive subject matter sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

The various procedures described herein can be implemented in hardware, firmware or software. A software implementation could use microcode, assembly language code, or a higher-level language code. The code may be stored on one or more volatile or non-volatile computer-readable media during execution or at other times. These computer-readable media may include hard disks, removable magnetic disks, removable optical disks, magnetic cassettes, flash memory cards, digital video disks, Bernoulli cartridges, random access memories (RAMs), read only memories (ROMs), and the like.

It is emphasized that the Abstract is provided to comply with 37 C.F.R. §1.72(b) requiring an Abstract that will allow the reader to ascertain the nature and gist of the technical disclosure. It is submitted with the understanding that it will not be used to interpret or limit the scope or meaning of the claims.

In the foregoing Detailed Description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. A system comprising:
a plurality of electronic devices, wherein selected ones of the electronic devices include a physical-tag and a logical-tag, wherein the physical-tag includes a physical-tag identifier, and wherein the logical-tag includes logical attribute information;
at least one physical-tag reading device, which is operable to read the physical-tag identifier from the physical-tag over an air interface;
at least one logical-tag reading device, which is operable to cause a software agent to read the logical attribute information from the logical-tag; and
a processing element, which is operable to associate the physical-tag identifier with the logical attribute information.

2. The system of claim 1, further comprising:
an asset manager, which is operable to store a plurality of tracking records, wherein a tracking record for a selected electronic device includes the physical-tag identifier and at least a portion of the logical attribute information.

3. The system of claim 2, wherein the tracking record includes information selected from a group of information types that includes a logical-tag identifier, the physical-tag identifier, a device type, a device owner identifier, a hardware configuration description, a software configuration description, an Internet protocol address, a user identifier, and device location information.

4. An apparatus comprising:
a logical-tag, which includes
an information storage medium, which is operable to store logical attribute information that includes a configuration description for an electronic device;
a physical-tag, which includes a physical-tag identifier that can be used to access the logical attribute information; and
a software agent, which is operable to retrieve the logical attribute information from the information storage medium in response to an information request from a requester, and to send the logical attribute information to the requester.

5. The apparatus of claim 4, wherein the physical-tag includes a radio-frequency identification tag, which is operable to store the physical-tag identifier using a storage medium that is readable by a physical-tag reading device using a radio-frequency signal.

6. The apparatus of claim 4, wherein the physical-tag includes an identification tag, which visually indicates the physical-tag identifier using a medium that is readable using a physical-tag reading device that includes an optical scanner.

7. The apparatus of claim 4, wherein the information storage medium is operable to store logical attribute information selected from a group of information types that includes a logical-tag identifier, the physical-tag identifier, a device type, a device owner identifier, a hardware configuration description, a software configuration description, an Internet protocol address, a user identifier, and device location information.

8. An apparatus comprising:
a processor, which is operable to create an information request to request logical attribute information that is stored by a logical-tag of a remote electronic device, wherein the logical attribute information includes a configuration description for the remote electronic device, wherein the processor is further operable to associate the logical attribute information with a physical-tag identifier, wherein the physical-tag identifier is retrieved from a physical-tag associated with the remote electronic device; and
an interface, operably coupled to the processor, which is operable to send the information request to the remote electronic device and to receive the logical attribute information from the remote electronic device.

9. The apparatus of claim 8, further comprising:
an asset manager, which is operable to store a tracking record for the remote electronic device, which includes the physical-tag identifier and at least a portion of the logical attribute information.

10. The apparatus of claim 8, further comprising:
a display device, which is operable to display at least a portion of the logical attribute information, wherein the logical attribute information includes information selected from a group of information types that includes a logical-tag identifier, the physical-tag identifier, a device type, a device owner identifier, a hardware configuration description, a software configuration description, an internet protocol address, a user identifier, and device location information.

11. An apparatus comprising:
a physical-tag reading device, which is operable to read, over an air interface, a physical-tag identifier indicated by a physical-tag associated with an electronic device; and
a processor, operably coupled to the physical-tag reading device, which is operable to associate the physical-tag identifier with logical attribute information that includes a configuration description for the electronic device.

12. The apparatus of claim 11, further comprising:
a display device, which is operable to display at least a portion of the logical attribute information, wherein the logical attribute information includes information selected from a group of information types that includes a logical-tag identifier, the physical-tag identifier, a device type, a device owner identifier, a hardware configuration description, a software configuration description, an internet protocol address, a user identifier, and device location information.

13. The apparatus of claim 11, further comprising:
a logical information retrieval device, which is operable to obtain the logical attribute information.

14. The apparatus of claim 13, wherein the logical information retrieval device includes a logical-tag reading device that is operable to obtain the logical attribute information from the electronic device over a wireless link.

15. The apparatus of claim 13, wherein the logical information retrieval device includes a logical-tag reading device that is operable to obtain the logical attribute information from the electronic device over a network connection.

16. The apparatus of claim 13, wherein the logical information retrieval device includes an interface that is operable to obtain the logical attribute information from a database.

17. The apparatus of claim 11, wherein the physical-tag reading device is further operable to obtain the logical attribute information from the physical-tag.

18. The apparatus of claim 11, wherein the physical-tag reading device is further operable to write the logical attribute information to the physical-tag.

19. An apparatus comprising:
a physical-tag reading device, which is operable to read, over an air interface, a physical-tag identifier indicated by a physical-tag associated with an electronic device; and
a communication interface that is operable to provide the physical-tag identifier to a remote processing element, which associates the physical-tag identifier with logical attribute information that includes a configuration description for the electronic device.

20. The apparatus of claim 19, wherein the communication interface is further operable to provide information that enables the remote processing element to identify a location of the device.

21. The apparatus of claim 19, wherein the apparatus further comprises a storage medium operable to store the physical-tag identifier.

22. The apparatus of claim 19, wherein the communication interface is a wireless interface.

23. The apparatus of claim 19, wherein the communication interface is a network interface.

24. An apparatus comprising:
a processor, operable to receive logical attribute information that includes a configuration description for a remote electronic device, and to receive a physical-tag identifier indicated by a physical-tag associated with the remote electronic device, and to store, within a database, the logical attribute information and the physical-tag identifier in association with each other; and
the database, operably connected to the processor, and which is capable of storing a plurality of tracking records, wherein a first tracking record includes the logical attribute information and the physical-tag identifier for the remote electronic device, and wherein other tracking records include logical attribute information and physical-tag identifiers for other remote electronic devices.

25. The apparatus of claim 24, further comprising:
an interface, operably coupled to the processor, which receives the physical-tag identifier from a physical-tag reading device.

26. The apparatus of claim 24, further comprising:
an interface, operably coupled to the processor, which receives the logical attribute information from the remote electronic device.

27. A method comprising:
creating a tracking record for a remote electronic device, wherein the tracking record includes a physical-tag identifier and tracking information, wherein the physical-tag identifier includes a value indicated by a physical-tag associated with the device, and wherein the tracking information includes logical attribute information stored by a logical-tag associated with the device; and
updating the tracking record when updated tracking information is received.

28. The method of claim 27, further comprising:
updating device location information within the tracking record, wherein the device location information is determined from information received from one or more physical-tag reading devices.

29. The method of claim 27, further comprising:
sending a request to the remote electronic device for current logical attribute information;
receiving a response from the remote electronic device with the current logical attribute information; and
updating the tracking record with the current logical attribute information.

30. The method of claim 27, further comprising:
receiving, from a physical-tag reading device, a request for at least a portion of the tracking information; and
returning the at least a portion of the tracking information to the physical-tag reading device.

31. The method of claim 30, further comprising:
verifying that the tag reading device has permission to access the at least a portion of the tracking information before sending the at least a portion of the tracking information.

32. A method comprising:
associating a physical-tag with an electronic device, wherein the physical-tag includes a physical-tag identifier that is readable over an air interface;
associating a logical-tag with the electronic device, wherein the logical-tag includes logical attribute information that includes a configuration description for the electronic device;
updating the logical attribute information by the logical-tag;
receiving a request for at least part of the logical attribute information from a remote requester having information regarding the physical-tag; and
sending the logical attribute information to the remote requester in response to the request.

33. The method of claim 32, wherein updating the logical attribute information comprises:
identifying system hardware and software configurations;
updating corresponding fields within the logical attribute information; and
updating a timestamp, which indicates when the corresponding fields were updated.

34. The method of claim 32, wherein updating the logical attribute information comprises:
receiving new logical attribute information from a remote source;
updating corresponding fields within the logical attribute information; and
updating a timestamp, which indicates when the corresponding fields were updated.

35. A method comprising:
a physical-tag reading device reading, over an air interface, a physical-tag identifier indicated by a physical-tag associated with an electronic device; and
retrieving logical attribute information that includes a configuration description for the electronic device based on the physical-tag identifier.

36. The method of claim 35, wherein reading the physical-tag identifier comprises reading the physical-tag identifier using a radio-frequency signal.

37. The method of claim 35, wherein reading the physical-tag identifier comprises reading the physical-tag identifier using an optical scanner.

38. The method of claim 35, wherein retrieving the logical attribute information comprises requesting the logical attribute information from a remote database, using the physical-tag identifier.

39. The method of claim 35, wherein retrieving the logical attribute information comprises requesting the logical attribute information from a logical-tag associated with the electronic device.

40. The method of claim 35, wherein retrieving the logical attribute information comprises retrieving the logical attribute information from a storage medium, using the physical-tag identifier.

41. The method of claim 35, wherein retrieving the logical attribute information comprises retrieving the logical attribute information from the physical-tag.

42. The method of claim 35, further comprising the physical-tag reading device writing at least a portion of the logical attribute information to the physical-tag.

43. The method of claim 35, further comprising:
displaying at least a portion of the logical attribute information, wherein the logical attribute information includes information selected from a group of information types that includes a logical-tag identifier, the physical-tag identifier, a device type, a device owner identifier, a hardware configuration description, a software configuration description, an Internet protocol address, a user identifier, and device location information.

44. A method comprising:
a physical-tag reading device reading, over an air interface, a physical-tag identifier indicated by a physical-tag associated with an electronic device; and
providing the physical-tag identifier to a remote processing element, which associates the physical-tag identifier with logical attribute information that includes a configuration description for the electronic device.

45. The method of claim 44, further comprising:
providing information that enables the remote processing element to determine a location of the physical-tag reading device.

46. The method of claim 44, further comprising:
storing the physical-tag identifier; and
sending the physical-tag identifier to the remote processing element.

47. A method comprising:
creating an information request to request logical attribute information that is stored by a logical-tag of a remote electronic device, wherein the logical attribute information includes a configuration description for the remote electronic device;
sending the information request to the remote electronic device;
receiving the logical attribute information from the remote electronic device; and
associating the logical attribute information with a physical-tag identifier, wherein the physical-tag identifier is retrieved from a physical-tag associated with the remote electronic device.

48. The method of claim 47, further comprising:
storing a tracking record for the remote electronic device, which includes the physical-tag identifier and at least a portion of the logical attribute information.

49. The method of claim 47, further comprising:
displaying at least a portion of the logical attribute information, wherein the logical attribute information includes information selected from a group of information types that includes a logical-tag identifier, the physical-tag identifier, a device type, a device owner identifier, a hardware configuration description, a software configuration description, an Internet protocol address, a user identifier, and device location information.

50. A method comprising:
a logical-tag of an electronic device storing logical attribute information that includes a configuration description for the electronic device;
retrieving a physical-tag identifier from a physical-tag associated with the electronic device;
retrieving the logical attribute information in response to an information request from a requester, the information request including the physical-tag identifier; and
sending the logical attribute information to the requester.

51. The method of claim 50, further comprising:
  determining the logical attribute information in response to a trigger event.

52. A computer-readable medium having program instructions stored thereon to perform a method, which when executed, results in:
  creating a tracking record for a remote electronic device, wherein the tracking record includes a physical-tag identifier and tracking information, wherein the physical-tag identifier includes a value indicated by a physical-tag associated with the device, and wherein the tracking information includes logical attribute information stored by a logical-tag associated with the device; and
  updating the tracking record when updated tracking information is received.

53. The computer-readable medium of claim 52, wherein executing the method further results in:
  updating device location information within the tracking record, wherein the device location information is determined from information received from one or more physical-tag reading devices.

54. The computer-readable medium of claim 52, wherein executing the method further results in:
  sending a request to the remote electronic device for current logical attribute information;
  receiving a response from the remote electronic device with the current logical attribute information; and
  updating the tracking record with the current logical attribute information.

* * * * *